(12) United States Patent
Sogo et al.

(10) Patent No.: US 10,341,984 B2
(45) Date of Patent: Jul. 2, 2019

(54) ANALYTIC SYSTEM AND ANALYTIC METHOD

(71) Applicant: Adinte, INC., Kyoto (JP)

(72) Inventors: Shinji Sogo, Kyoto (JP); Kunio Arakawa, Kyoto (JP); Manabu Inamori, Kyoto (JP); Shingo Fujino, Kyoto (JP)

(73) Assignee: Adinte, INC., Kyoto (JP)

( * ) Notice: Subject to any disclaimer, the term of this patent is extended or adjusted under 35 U.S.C. 154(b) by 0 days.

(21) Appl. No.: 15/574,875

(22) PCT Filed: May 8, 2017

(86) PCT No.: PCT/JP2017/017336
§ 371 (c)(1),
(2) Date: Nov. 17, 2017

(87) PCT Pub. No.: WO2017/221560
PCT Pub. Date: Dec. 28, 2017

(65) Prior Publication Data
US 2019/0104496 A1    Apr. 4, 2019

(30) Foreign Application Priority Data

Jun. 24, 2016 (JP) ................................. 2016-125114

(51) Int. Cl.
*H04W 24/00* (2009.01)
*H04W 64/00* (2009.01)
(Continued)

(52) U.S. Cl.
CPC ........... *H04W 64/006* (2013.01); *B64C 13/18* (2013.01); *B64C 39/02* (2013.01); *B64C 39/024* (2013.01);
(Continued)

(58) Field of Classification Search
CPC ..... H04W 64/006; H04W 4/029; H04W 4/80; G05D 1/104; G05D 1/0044; B64C 39/024;
(Continued)

(56) References Cited

U.S. PATENT DOCUMENTS 10,134,092 B1 * 11/2018 Harvey ................. G06Q 40/08
2013/0287261 A1   10/2013 Lee et al.
(Continued)

FOREIGN PATENT DOCUMENTS

JP    2010238024    10/2010
JP    2013128287    6/2013
(Continued)

OTHER PUBLICATIONS

Written Opinion of the International Searching Authority, Application No. PCT/JP2017,017336, dated Jul. 11, 2017. Partial English language translation.

*Primary Examiner* — Khoi H Tran
*Assistant Examiner* — B M M Hannan
(74) *Attorney, Agent, or Firm* — Renner, Otto, Boisselle & Sklar, LLP

(57) ABSTRACT

The flight control part 201 makes the unmanned aerial vehicle fly along a flight path in a predetermined area. The radio wave acquisition part 202 acquires radio wave information including a radio wave intensity when the radio unit of the unmanned aerial vehicle detects a short-distance radio wave of the user terminal during the flight of the unmanned aerial vehicle. The flight position acquisition part 203 acquires GPS position information of the unmanned aerial vehicle when the radio unit detected the short-distance radio wave, as a flight position of the unmanned aerial vehicle based on a GPS unit of the unmanned aerial vehicle. The terminal position calculation part 204 calculates a presence (Continued)

position of the user terminal in the area based on a radio wave intensity of the acquired radio wave information, and the acquired flight position of the unmanned aerial vehicle. The user attribute analysis part 205 arranges the calculated presence position of the user terminal in the map information corresponding to the area, and analyzes user attribute information of the user terminal based on place attribute information indicating a characteristic of the place where the presence position is arranged.

4 Claims, 17 Drawing Sheets

(51) Int. Cl.
*B64C 13/18* (2006.01)
*B64C 39/02* (2006.01)
*G01C 21/26* (2006.01)
*G06Q 30/02* (2012.01)
*H04B 17/318* (2015.01)
*H04W 4/029* (2018.01)
*H04W 4/80* (2018.01)
*G05D 1/10* (2006.01)

(52) U.S. Cl.
CPC ............. *G01C 21/26* (2013.01); *G05D 1/104* (2013.01); *G06Q 30/02* (2013.01); *H04B 17/318* (2015.01); *H04W 4/029* (2018.02); *H04W 4/80* (2018.02); *B64C 2201/122* (2013.01); *B64C 2201/145* (2013.01)

(58) Field of Classification Search
CPC ........ B64C 2201/122; B64C 2201/145; H04B 17/318; G08G 5/006
USPC ............................................. 455/456.1–457
See application file for complete search history.

(56) References Cited

U.S. PATENT DOCUMENTS

| 2013/0311286 | A1 | 11/2013 | Detwiler |
| 2016/0117853 | A1* | 4/2016 | Zhong ................ B64C 39/024 345/634 |
| 2016/0205654 | A1* | 7/2016 | Robinson, Jr. ........ H04W 4/029 455/456.3 |
| 2016/0253907 | A1* | 9/2016 | Taveira ................ G08G 5/006 701/3 |

FOREIGN PATENT DOCUMENTS

| JP | 2014174883 | 9/2014 |
| JP | 2015046152 | 3/2015 |
| JP | 2015060429 | 3/2015 |
| JP | 2015184376 | 10/2015 |
| JP | 2015188150 | 10/2015 |
| JP | 2015207149 | 11/2015 |
| JP | 2016004336 | 1/2016 |

* cited by examiner

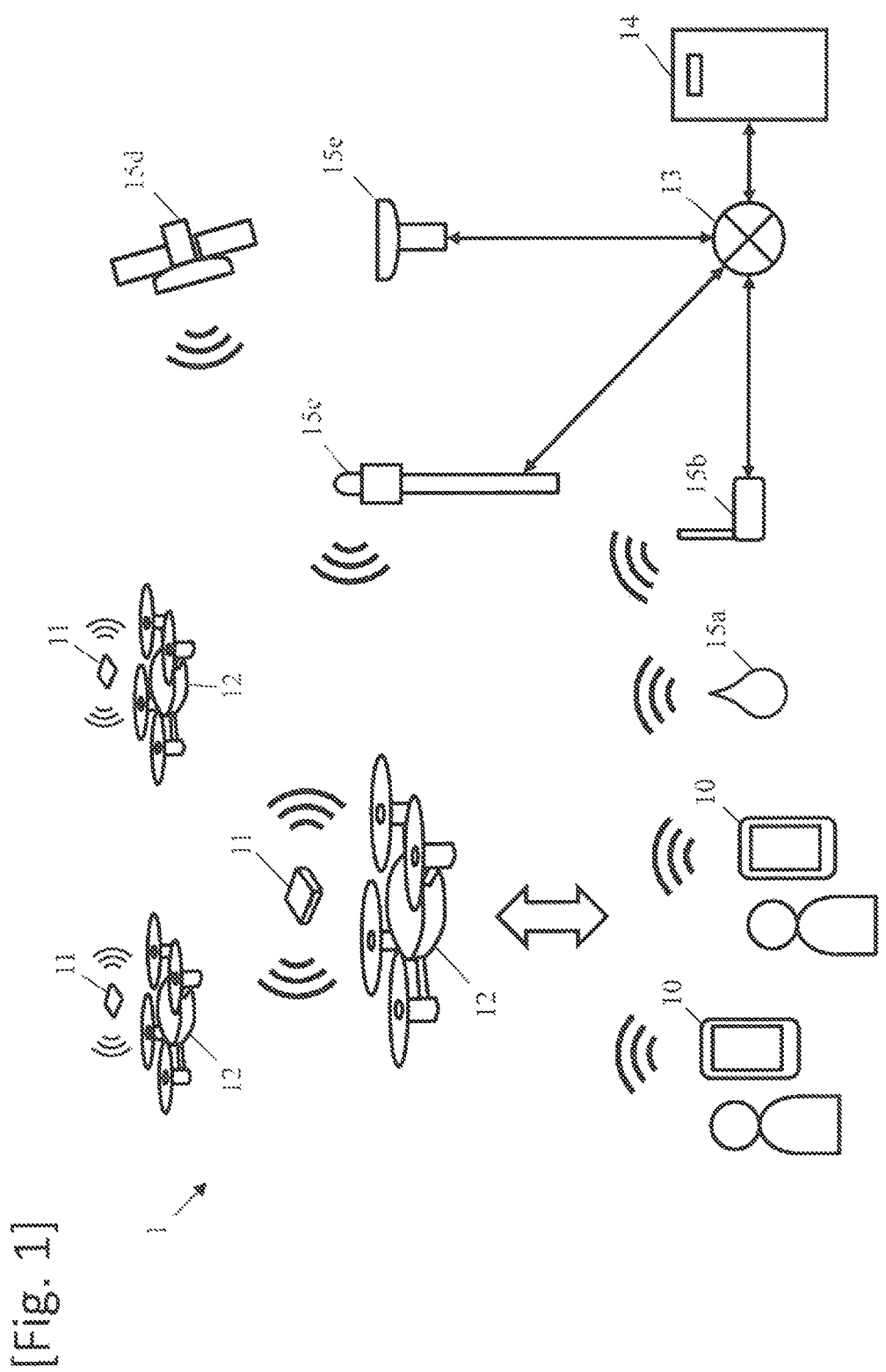
[Fig. 1]

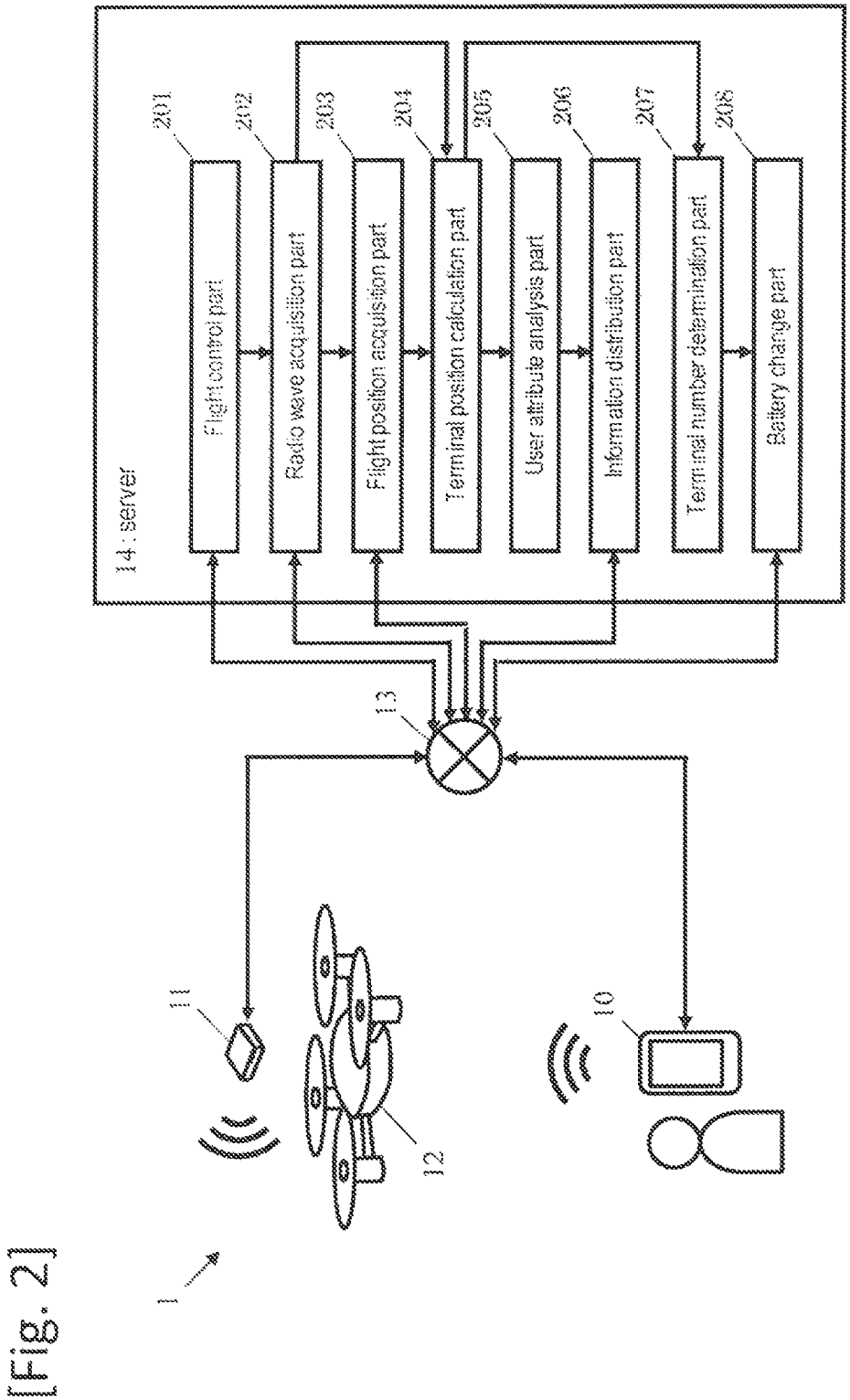
[Fig. 2]

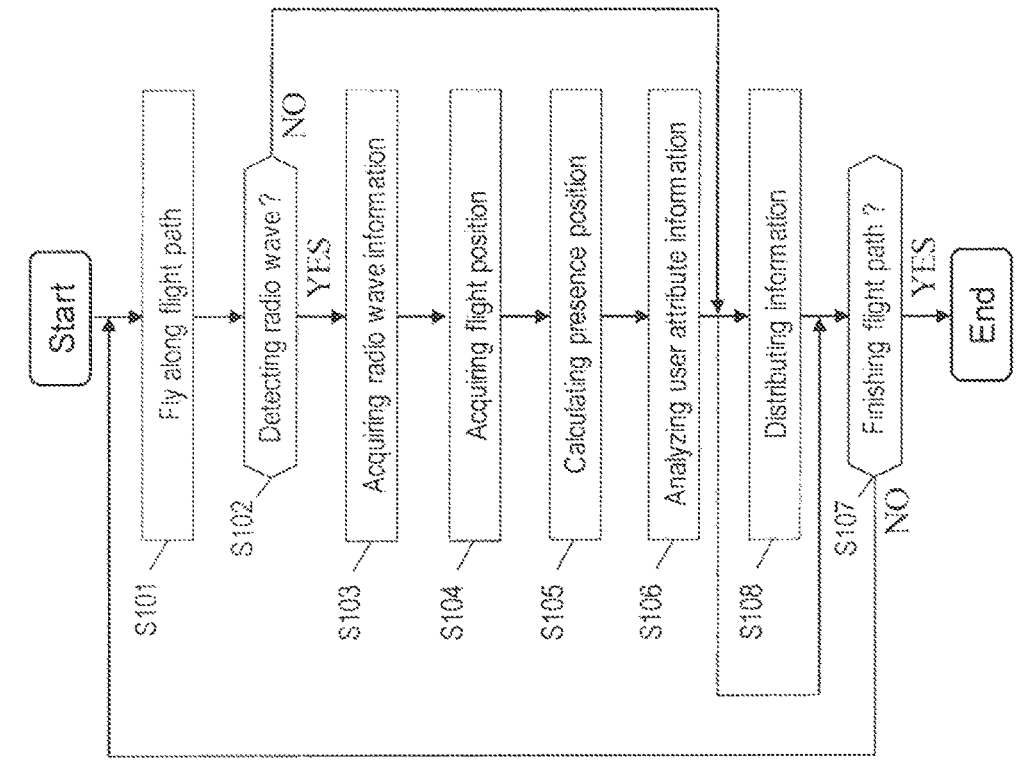
[Fig. 3]

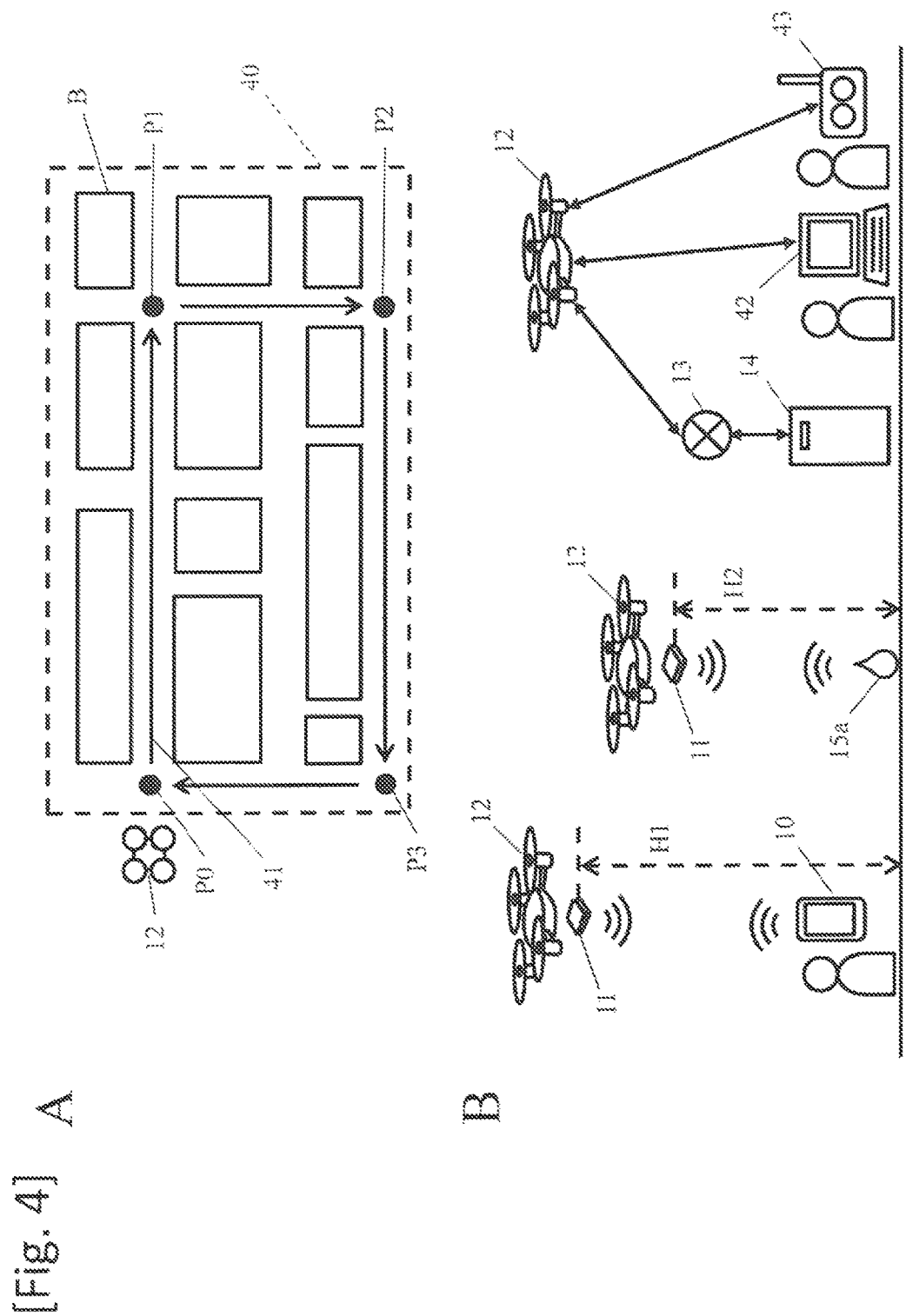
[Fig. 4]

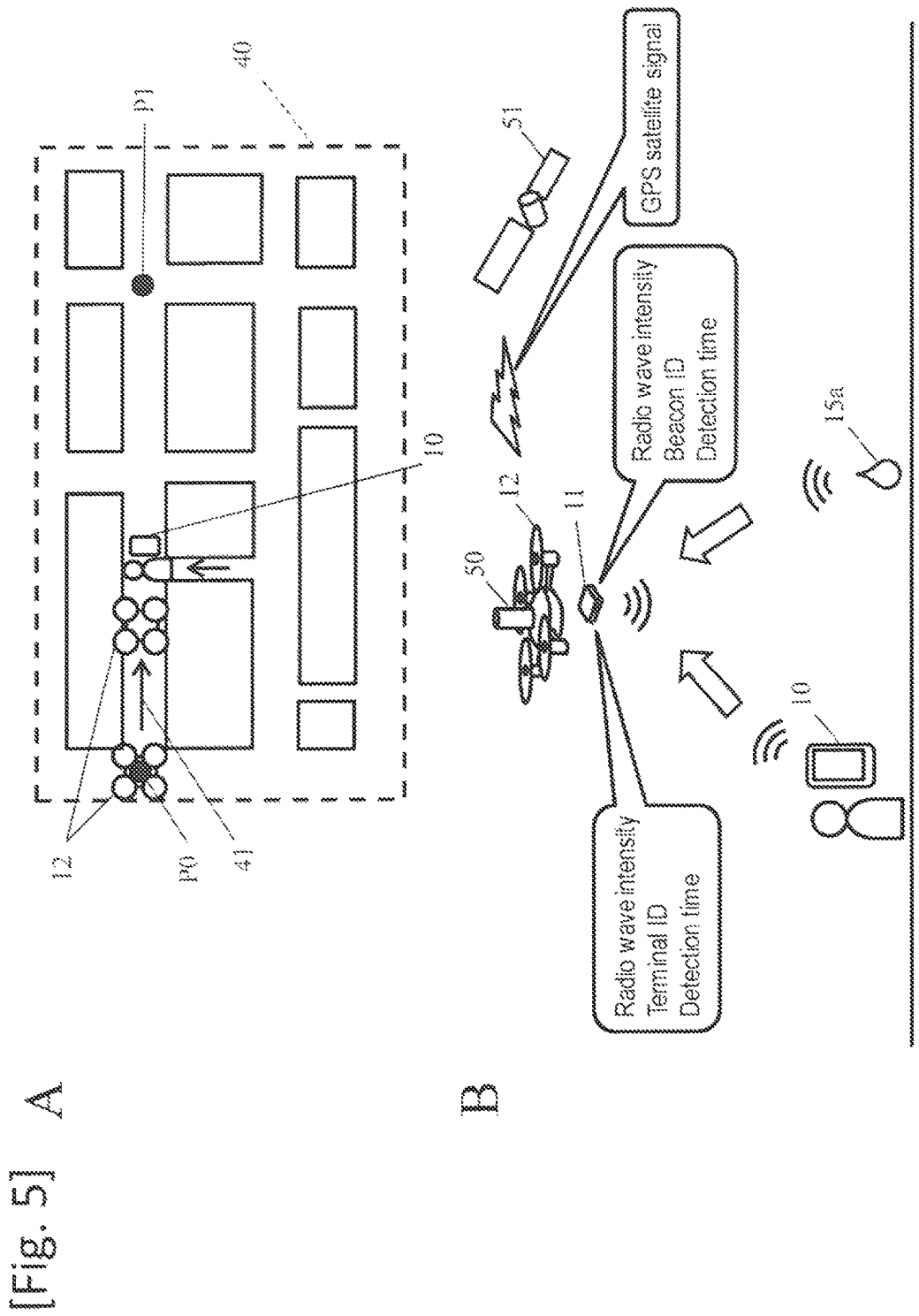

[Fig. 6]
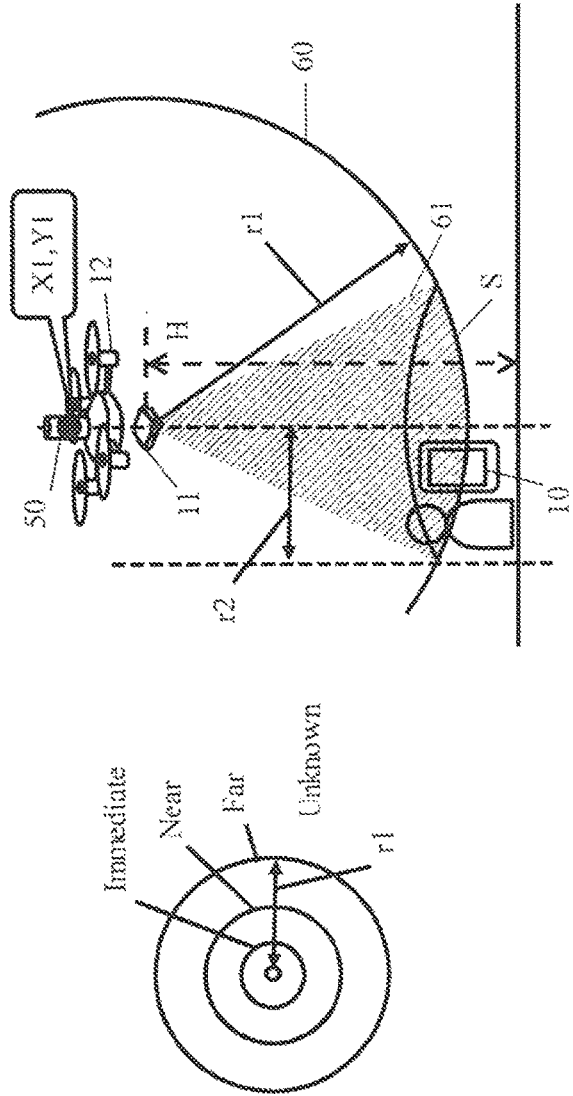

[Fig. 7]
A 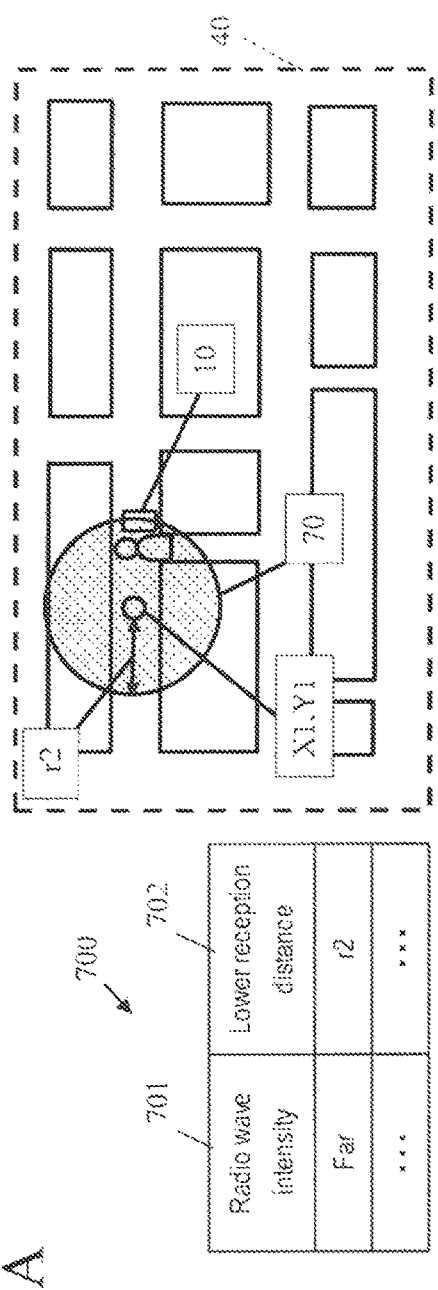
B 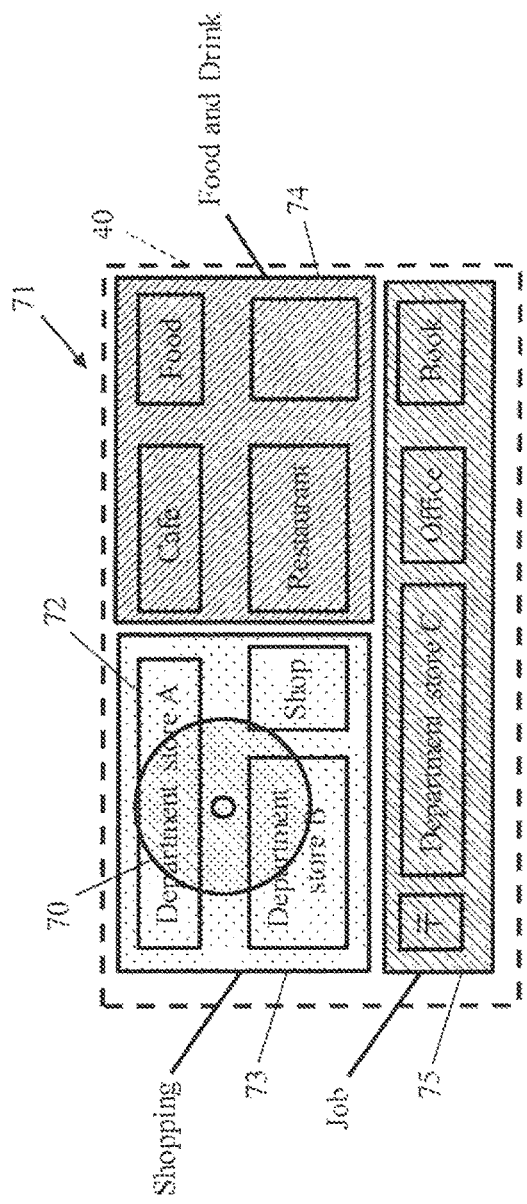

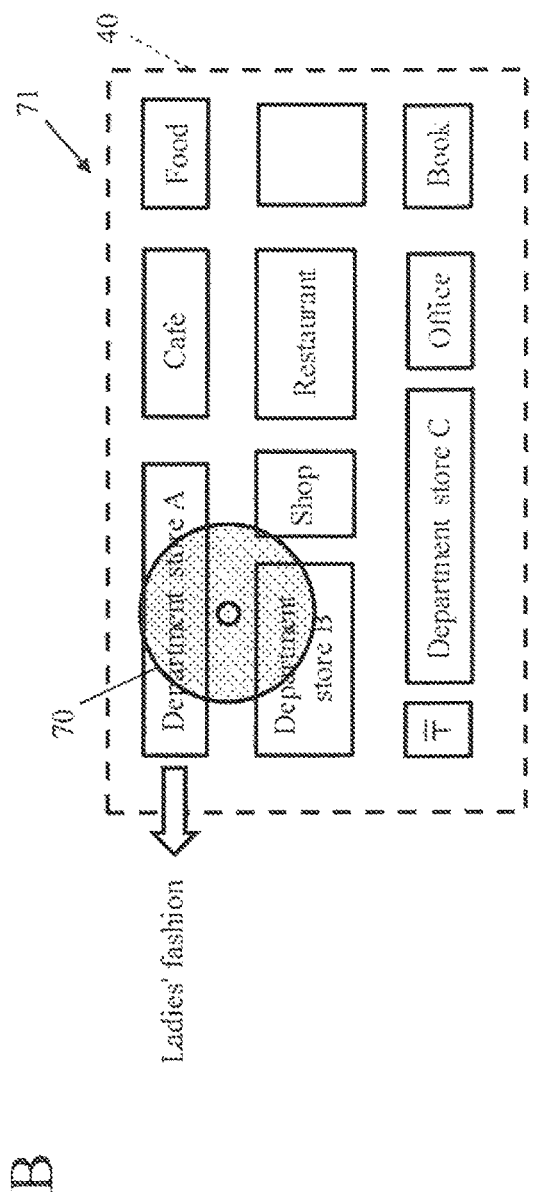

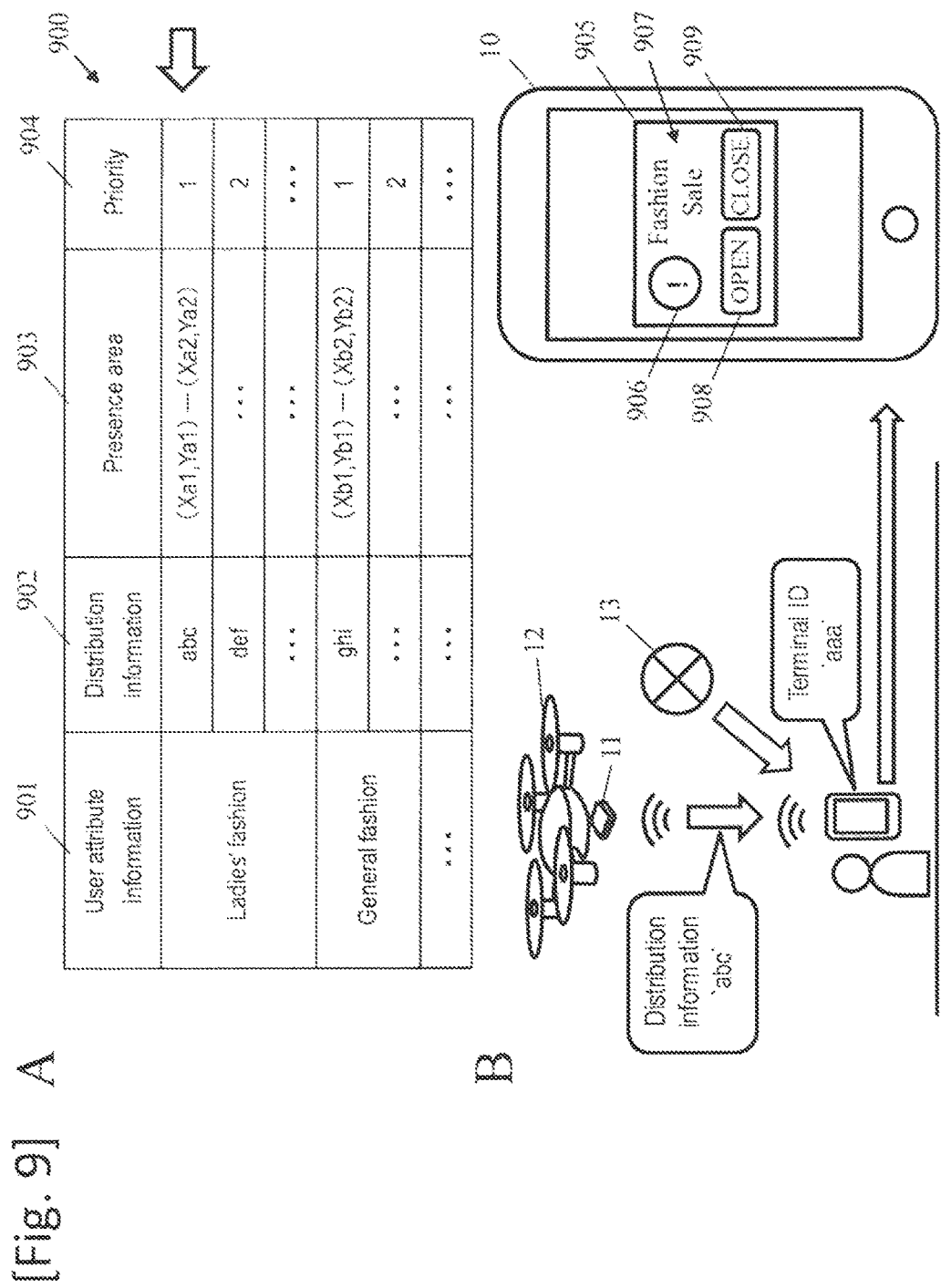

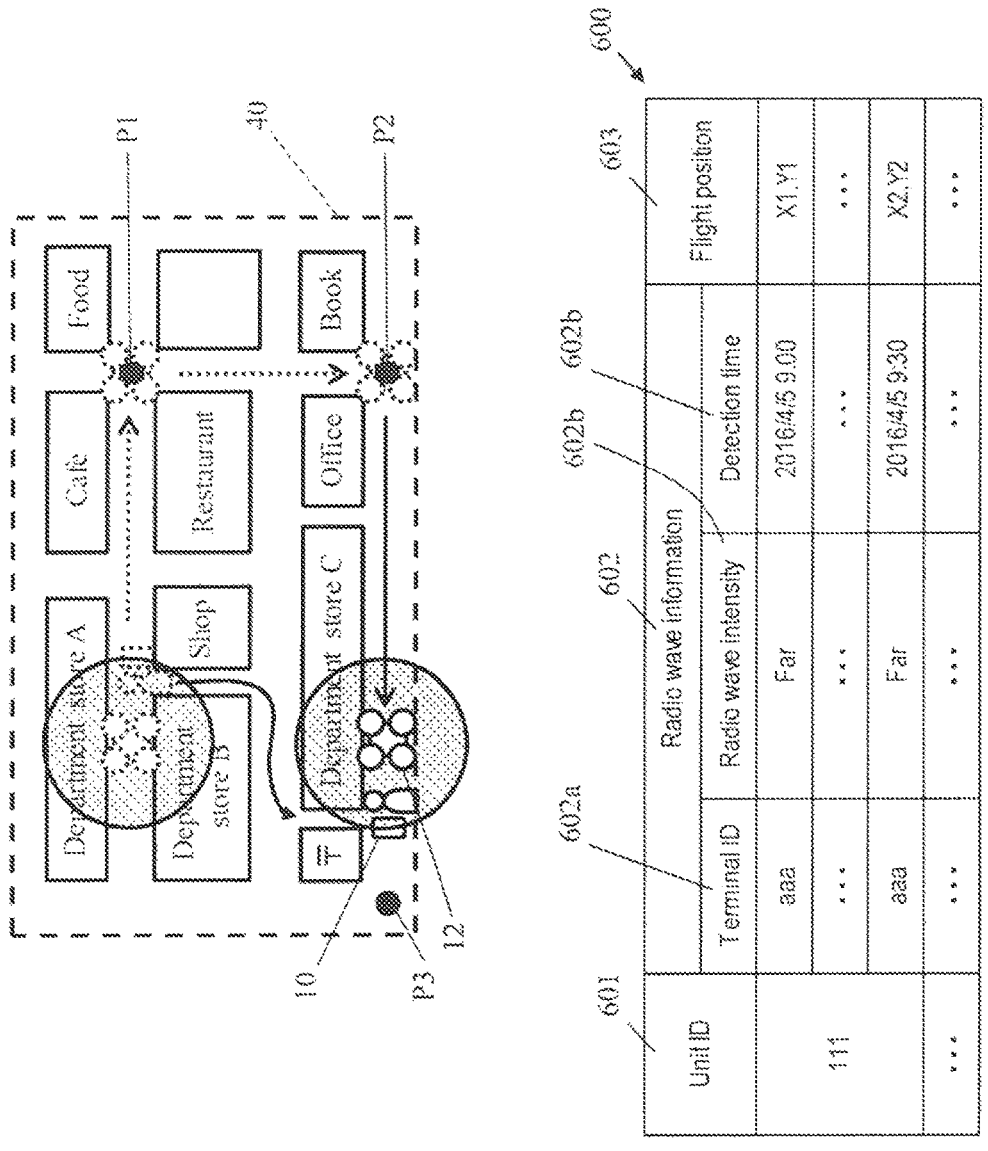

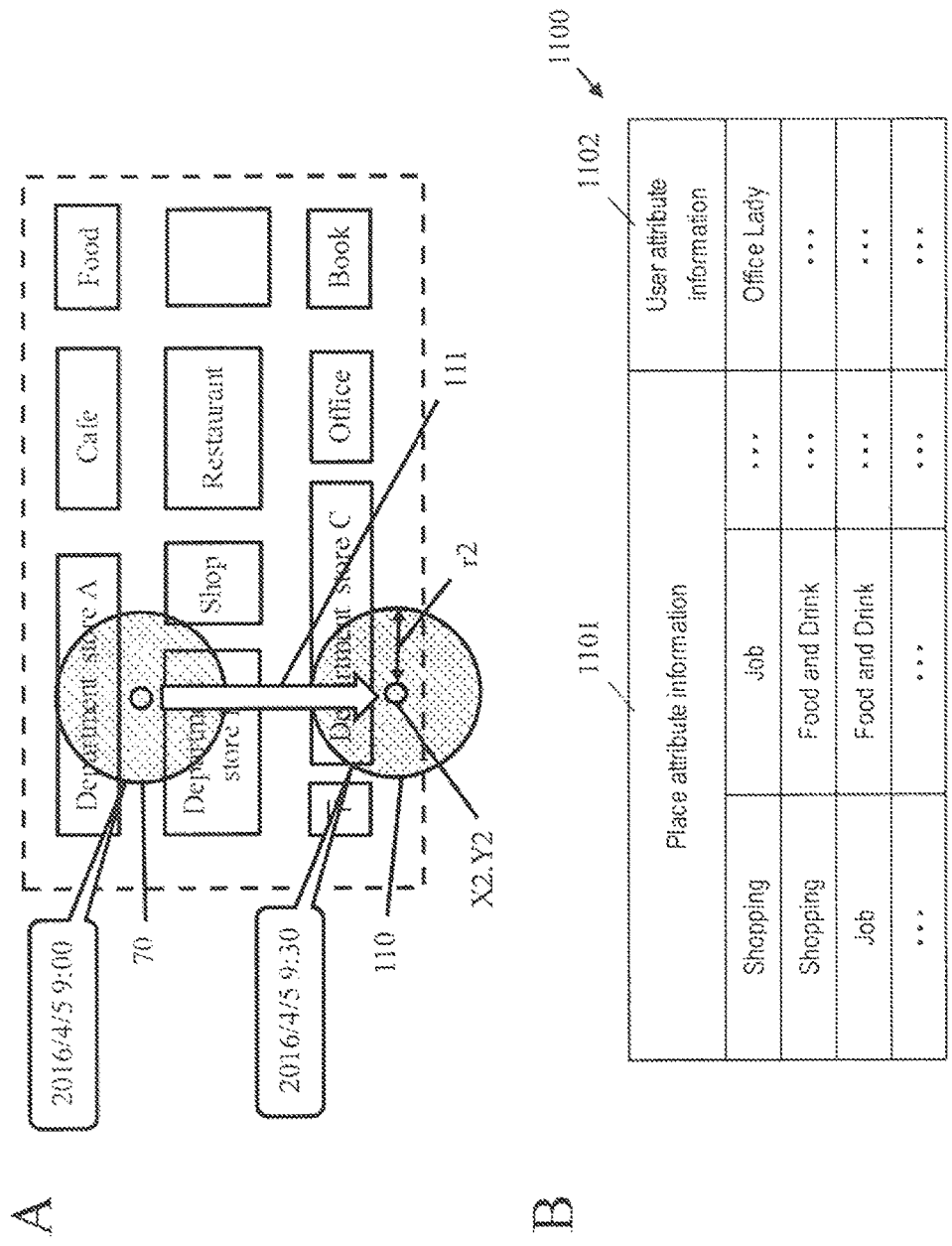

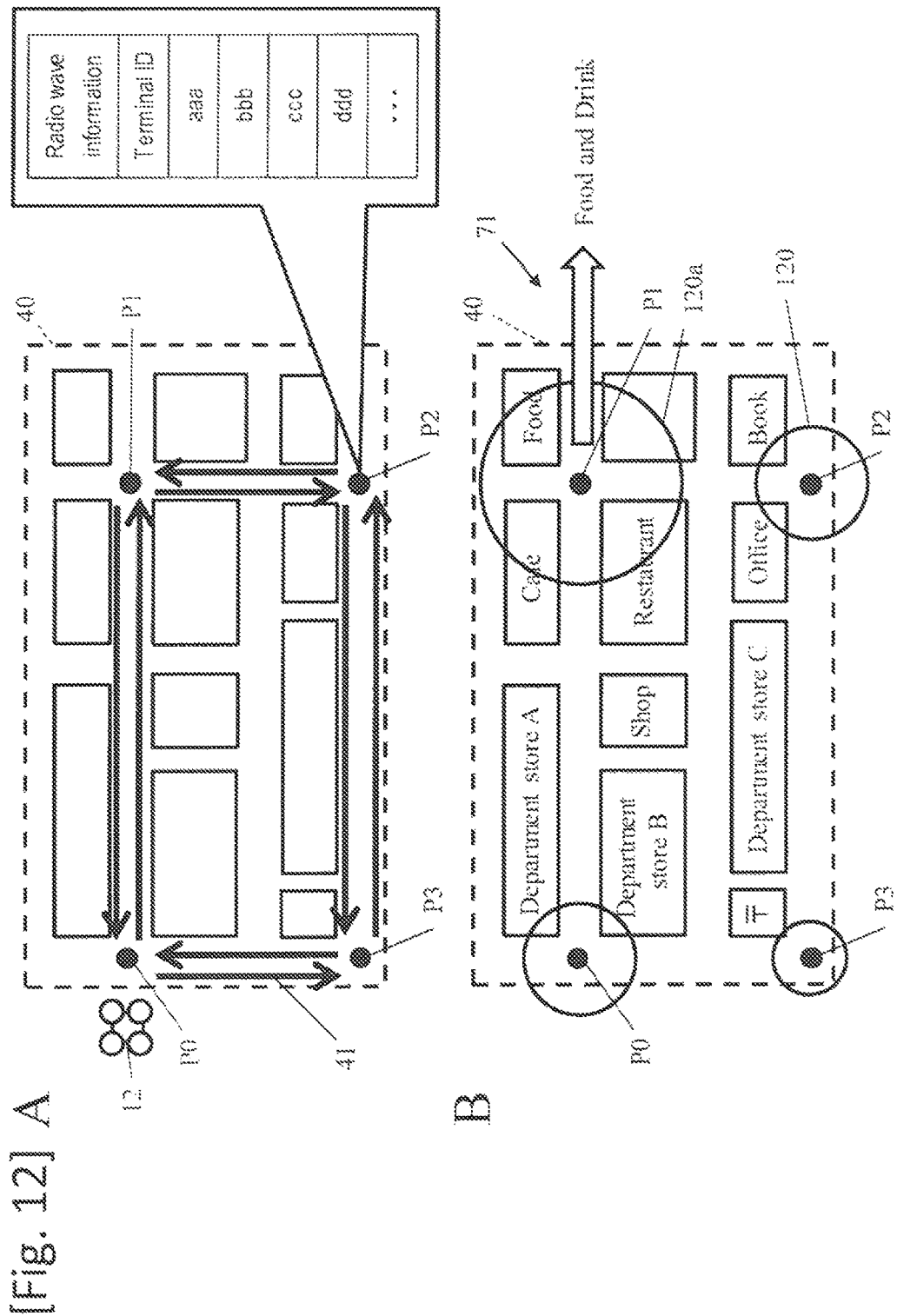
[Fig. 12]

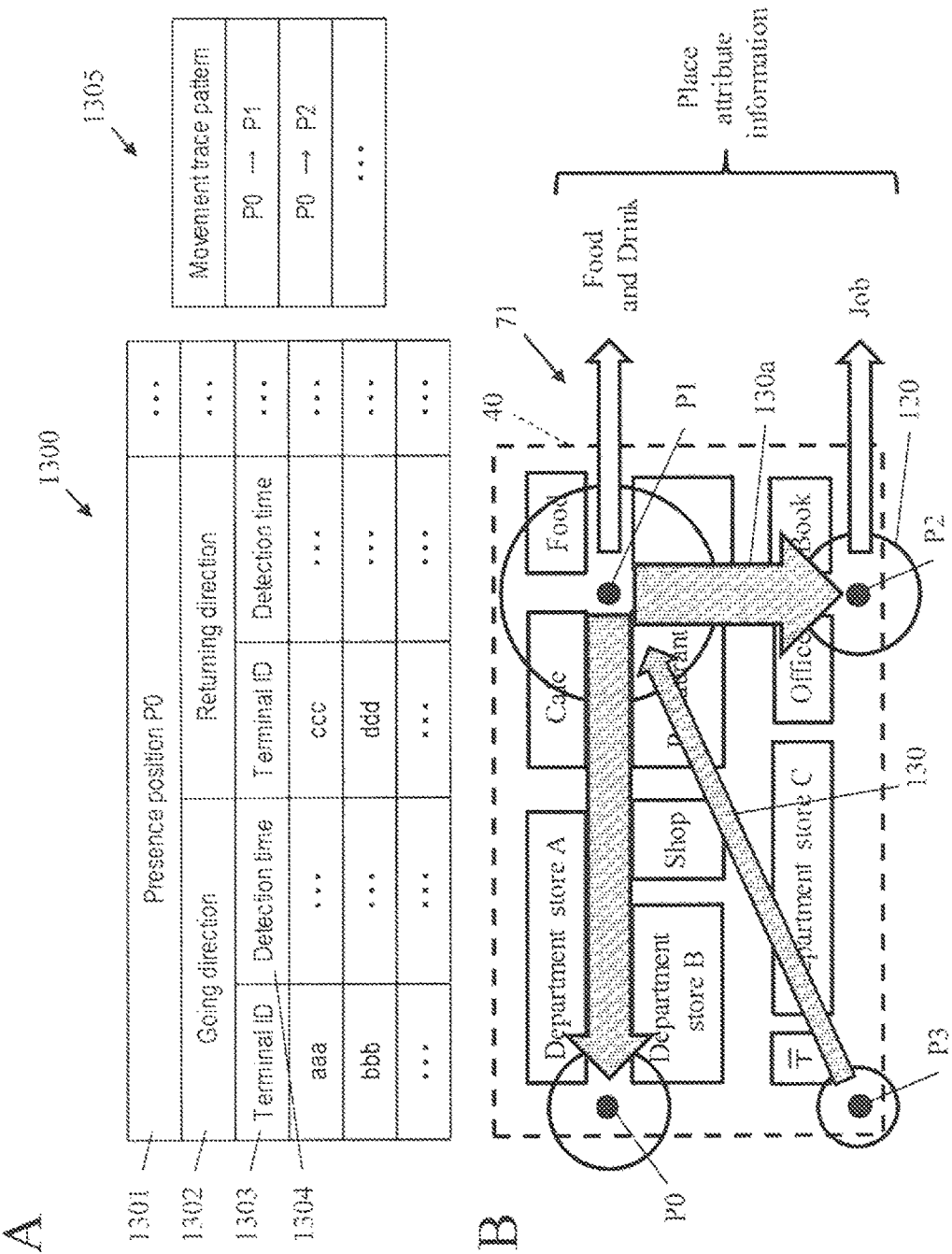

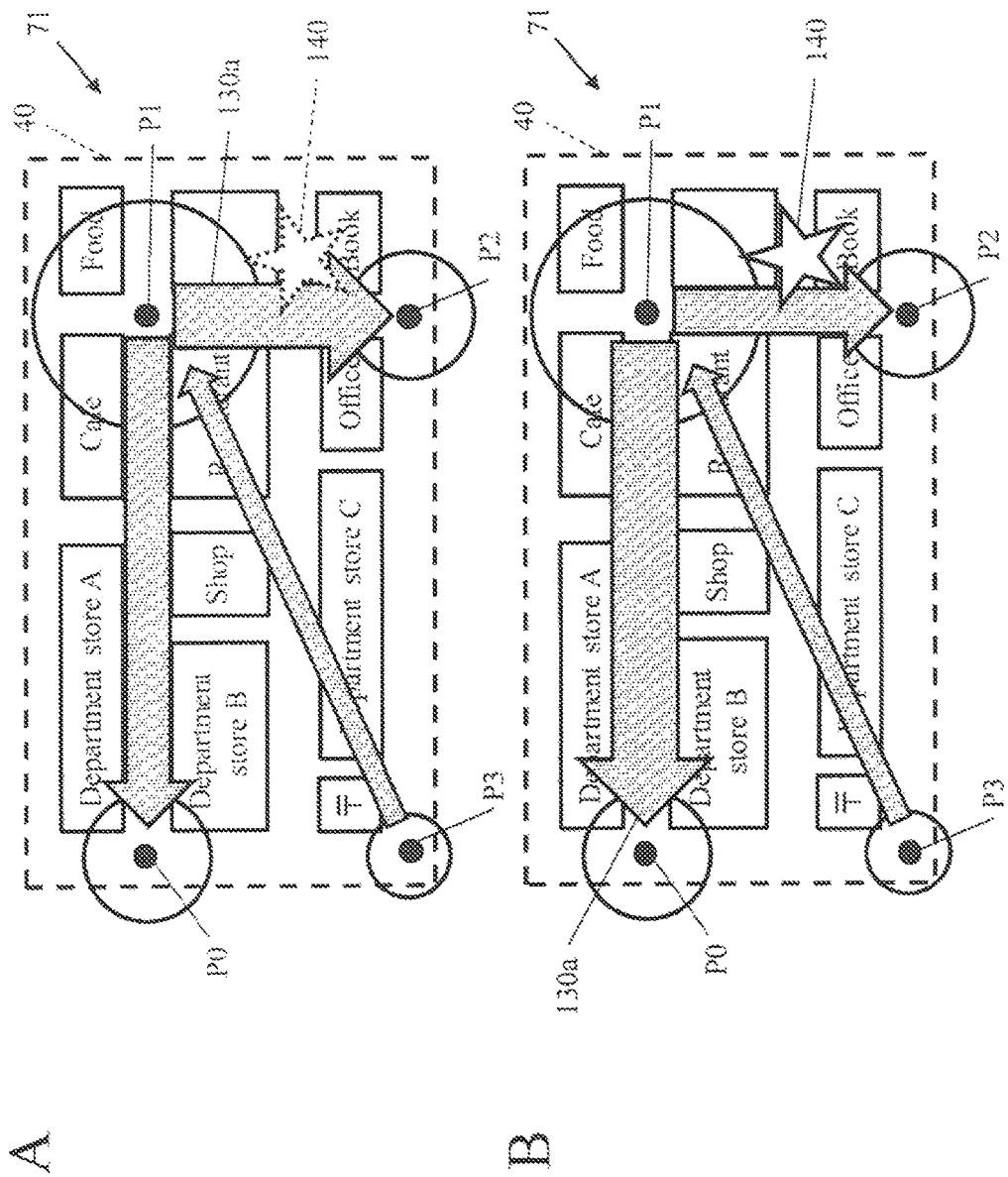

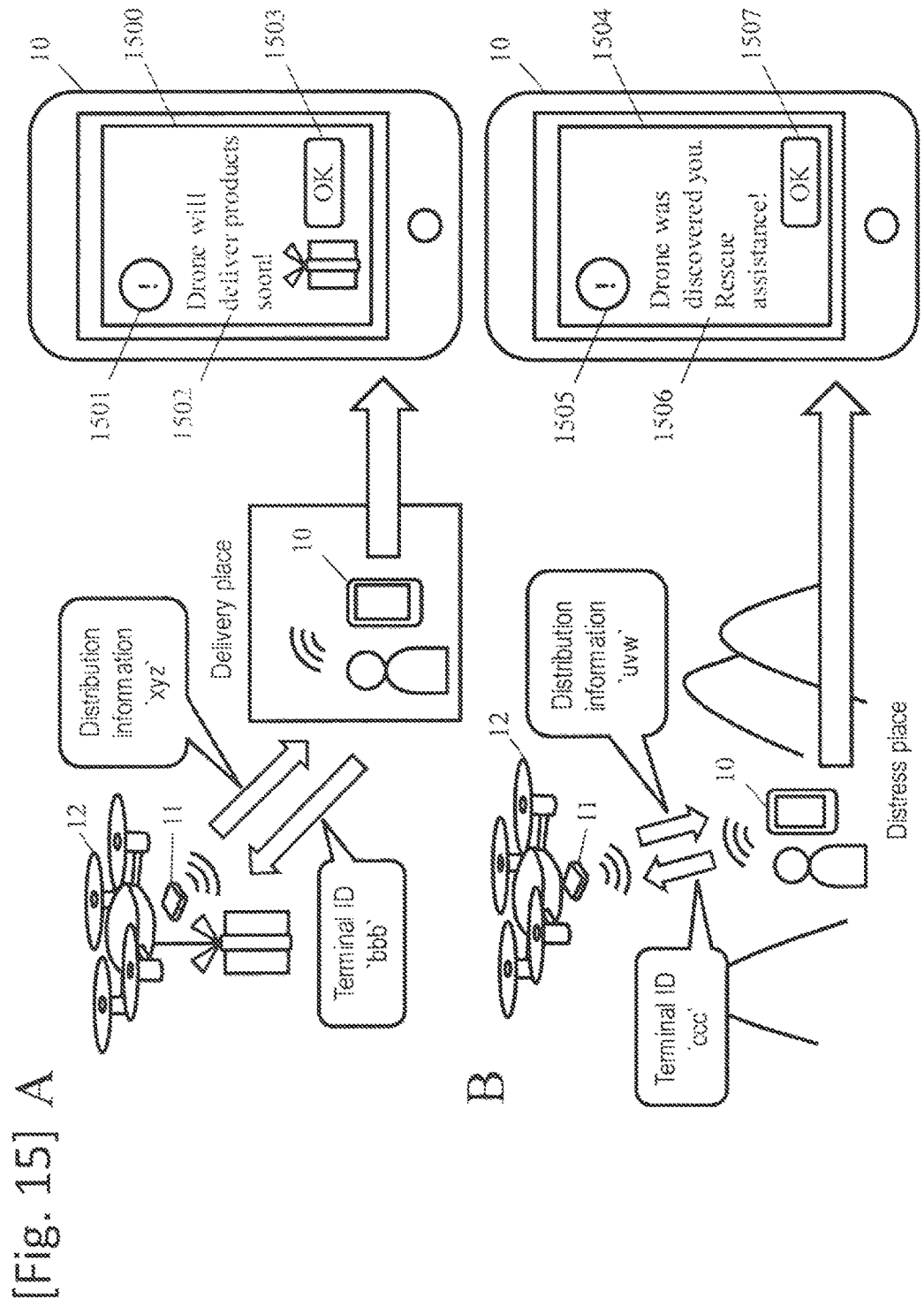

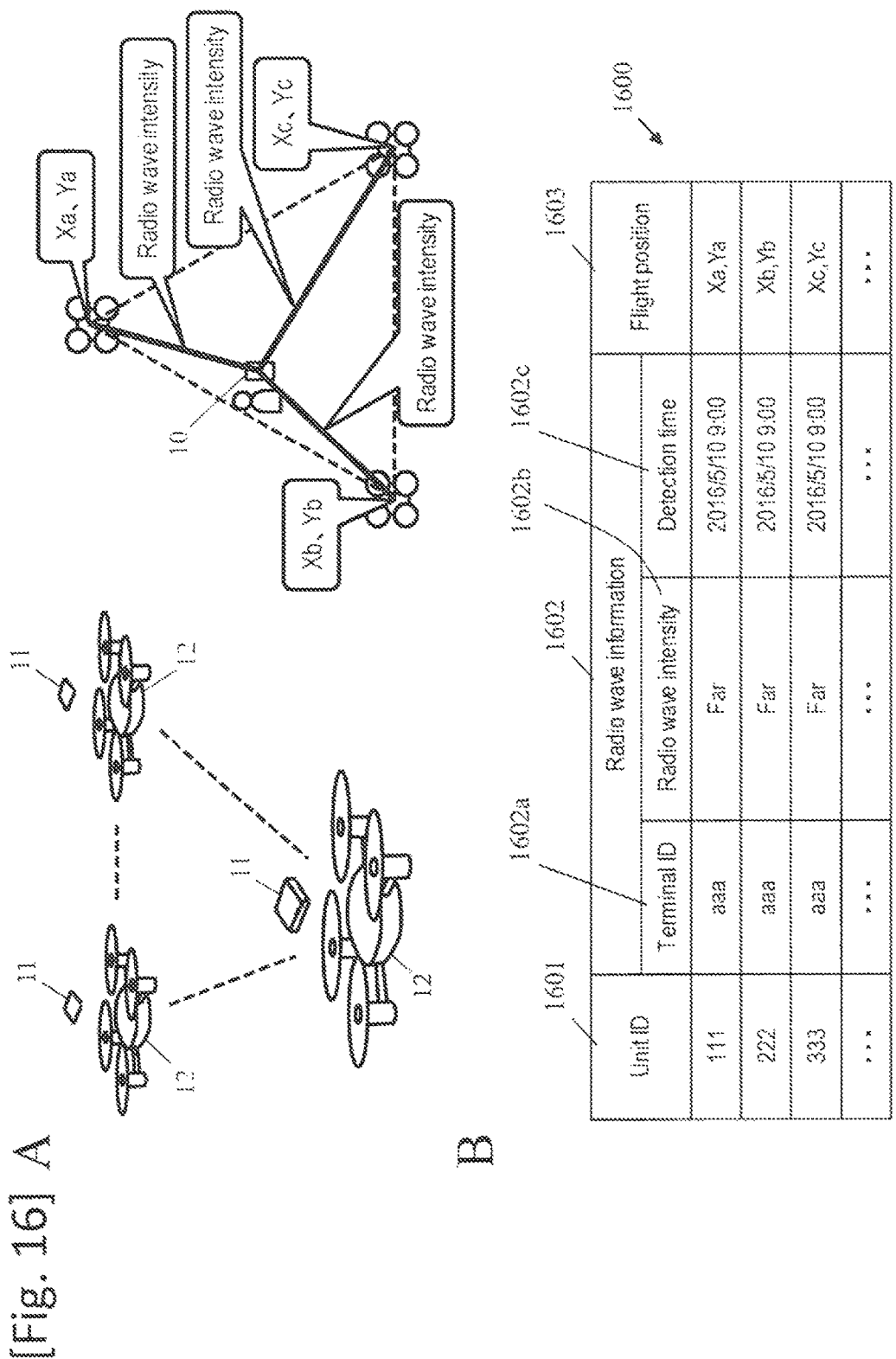

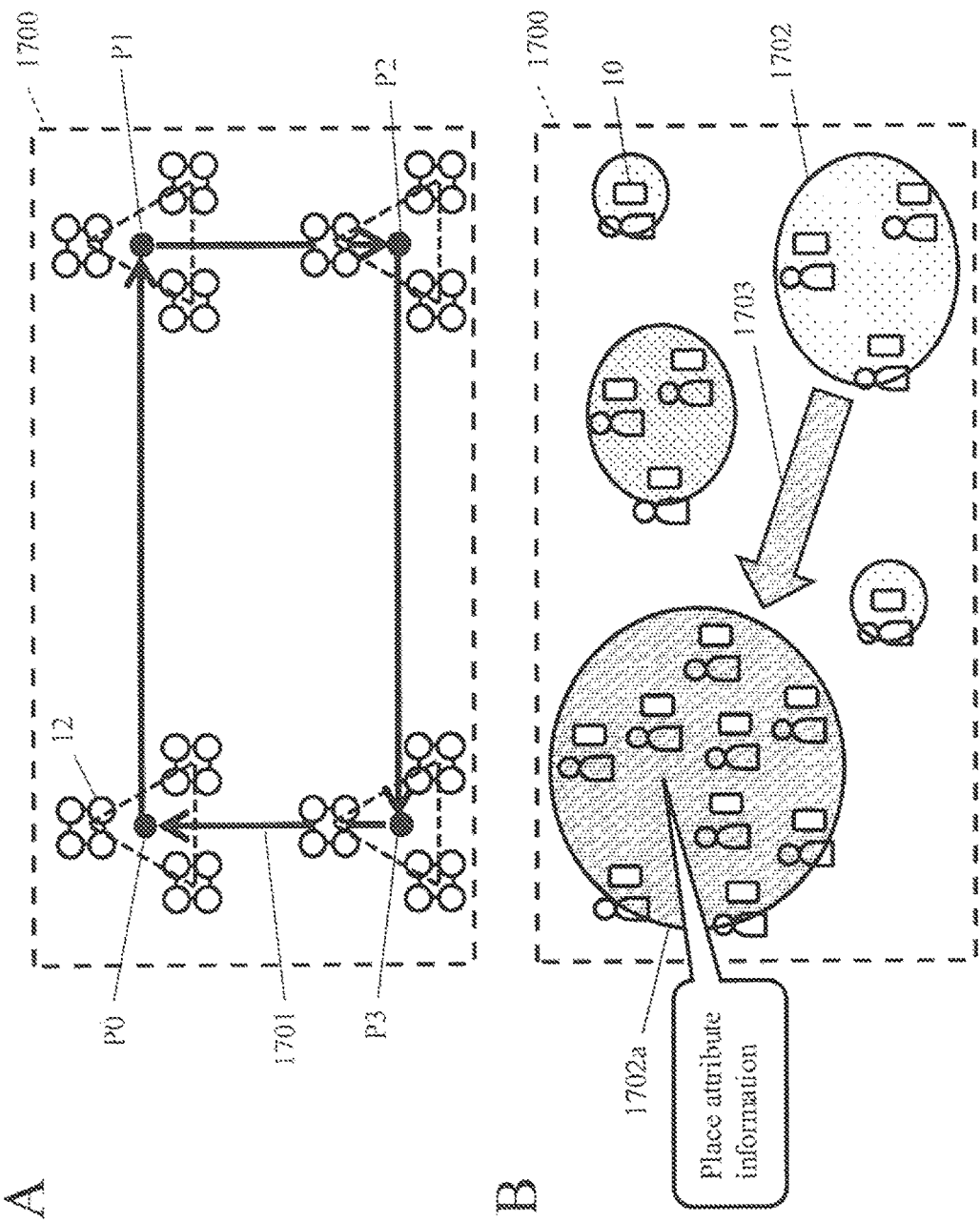

ANALYTIC SYSTEM AND ANALYTIC METHOD

This application is a national phase of International Application No. PCT/JP2017/017336 filed May 8, 2017, which claims priority to Japanese Patent Application No. 2016-125114 filed Jun. 24, 2016 in the Japan Patent Office, which are hereby incorporated herein by reference.

TECHNICAL FIELD

The present invention relates to an analytic system and an analytic method.

BACKGROUND ART

Techniques using unmanned aircraft (UAV: Unmanned Aerial Vehicle) for advertising or monitoring people exist recently. For example, Patent Literature 1 and Patent Literature 2 disclose techniques on an advertisement. Patent Literature 3 discloses a movement control machine controlling a movement object such as a manned or unmanned autonomy model airship robot airplane, helicopter, bike, bicycle, quadruped walking robot, or the like. This movement object provides various kinds of advertisement information. In this way, it is described to enhance the advertising effect.

Patent Literature 4 discloses a monitoring system using a drone device. This monitoring system is described to always check a position of a monitored person to be a monitored object, and show an inhibition for a criminal. Patent Literature 5 discloses an aerial video distribution system. Patent Literature 6 discloses a radio control system of drones. Literature 7 discloses an electronic device to manage the traffic.

Meanwhile, as shown in Patent Literature 8, the present inventors invented a marketing system and a marketing method for estimating action history of a user terminal based on short-distance radio communication between a radio unit (wireless unit) and a user terminal, and analyzing user attribute information including a user preference.

CITATION LIST

Patent Literature

Patent Literature 1

Japanese Unexamined Patent Application Publication No. 2010-238024

Patent Literature 2

Japanese Unexamined Patent Application Publication No. 2014-174883

Patent Literature 3

Japanese Unexamined Patent Application Publication No. 2015-184376

Patent Literature 4

Japanese Unexamined Patent Application Publication No. 2015-207149

Patent Literature 5

Japanese Unexamined Patent Application Publication No. 2015-188150

Patent Literature 6

Japanese Unexamined Patent Application Publication No. 2013-128287

Patent Literature 7

U.S. Patent Application Publication No. 2013/0287261

Patent Literature 8

Japanese Unexamined Patent Application Publication No. 2016-4336

SUMMARY OF INVENTION

Technical Problem

Geo-targeting (local specific technique) is performed nowadays, the Geo-targeting providing information specialized in a residence area of a user to the user and performing advertisement or sales promotion to the user with the impact.

This Geo-targeting generally estimates a geographical presence position of the user by using identification information on network communication such as a base station of a user terminal connecting to Internet, IP address of desktop terminal, or the like. Therefore, the estimation of the presence position of the user is limited, and it is a problem that the operation by the user in the network communication such as browsing history of the user becomes mainly.

New radio unit such as Wi-Fi sensor or Beacon terminal is appearing in order to collect actual action information of the user. The radio units are possible to catch action information (presence position, movement trace, or the like) of the user with high accuracy by using short-distance radio communication with a user terminal in comparison with GPS that may cause an error of 100 m or more, and IC tag that can capture only within a range of several cm. The new radio unit analyzes user attribute information based on the user action information and utilizes for marketing.

However, the radio unit is necessary to usually install in a specific location, considering the weather such as rain, or wind, the installation location is basically indoors, and is limited in the specific location. So the radio unit is a setting type basically, in order to collect user action information in a wide area, it is necessary to install each of the plural radio unit for each location. In order to perform the Geo-targeting more effectively, it is necessary to collect user action information in a wide range including not only indoors but also outdoors with high accuracy, and to analyze user attribute information concretely.

Accordingly, the present invention was created as a solution for the problems and aims at providing an analytic system and an analytic method that can collect user action information in a wide range including outdoors form the sky, and analyze user attribute information concretely.

Solution to Problem

An analytic system in the present invention comprises one or more unmanned aerial vehicles equipped with a radio unit capable of performing short-distance radio communication to a user terminal, and a server capable of performing radio communication to the unmanned aerial vehicle, the analytic system comprising a flight control part, a radio wave acquisition part, a flight position acquisition part, a terminal position calculation part, and a user attribute analysis part. The flight control part makes the unmanned aerial vehicle fly along a flight path in a predetermined area. The radio wave acquisition part acquires radio wave information including a radio wave intensity when the radio unit of the unmanned aerial vehicle detects a short-distance radio wave of the user terminal during the flight of the unmanned aerial vehicle. The flight position acquisition part acquires GPS position information of the unmanned aerial vehicle when the radio unit detected the short-distance radio wave, as a flight position of the unmanned aerial vehicle based on a GPS unit of the unmanned aerial vehicle. The terminal position calculation part calculates a presence position of the user terminal in the area based on a radio wave intensity of the acquired radio wave information, and the acquired flight position of the unmanned aerial vehicle. The user attribute analysis part arranges the calculated presence position of the user terminal in map information corresponding to the area, and analyzes user attribute information of the user terminal based on place attribute information indicating a characteristic of the place where the presence position is arranged.

An analytic method in the present invention is a method of an analytic system comprising one or more unmanned aerial vehicles equipped with a radio unit capable of performing short-distance radio communication to a user terminal, and a server capable of performing radio communication to the unmanned aerial vehicle, the analytic method comprising a flight control step, a radio wave acquisition step, a flight position acquisition step, a terminal position calculation step, and a user attribute analysis step.

Advantageous Effects of Invention

According to the present invention, the present invention can collect user action information in a wide range including outdoors form the sky, and analyze user attribute information concretely.

BRIEF DESCRIPTION OF DRAWINGS

FIG. 1 is the outline diagram indicating the analytic system according to the present invention.

FIG. 2 is the functional block diagram indicating the analytic system according to the present invention.

FIG. 3 is the flowchart indicating execution steps of the analytic system according to the present invention.

FIG. 4A is an example of an area and a flight path of the analytic system according to the present invention.

FIG. 4B is an example of a relationship among the unmanned aerial vehicle, the user terminal, and the Beacon terminal, and an operation method of the unmanned aerial vehicle in the present invention.

FIG. 5A is an example in this case that the unmanned aerial vehicle is proximate to the user terminal in the present invention.

FIG. 5B is an example of an acquisition method of a flight position of the unmanned aerial vehicle in the present invention.

FIG. 6A is an example of an information table in the present invention.

FIG. 6B is an example a relationship between a radio wave intensity of a short-distance radio wave and a reception distance, and a relationship between a spherical radio wave reception zone of the radio unit and a conical radio wave reception zone in the present invention.

FIG. 7A is an example of a intensity distance table and a presence position of the user terminal in the area in the present invention.

FIG. 7B is an example of map information in the present invention.

FIG. 8A is an example of a place attribute information table in the present invention.

FIG. 8B is an example in this case that the analytic system according to the present invention analyzes user attribute information.

FIG. 9A is an example of distribution information table in the present invention.

FIG. 9B is an example in this case that the analytic system according to the present invention distributed distribution information to the user terminal.

FIG. 10A is an example in this case that the unmanned aerial vehicle in the present invention was proximate to a specific user terminal twice.

FIG. 10B is an example of an information table in the present invention.

FIG. 11A is an example of a presence position of the user terminal and a movement trace in the present invention.

FIG. 11B is an example of a user attribute information table in the present invention.

FIG. 12A is an example of a flight path of the analytic system and radio wave information collected at a predetermined spot FIG. 12B is an example in this case that the analytic system according to the present invention analyzed user attribute information of a group.

FIG. 13A is an example of a terminal information table in the present invention.

FIG. 13B is an example of a movement trace pattern in the present invention.

FIG. 14A is an example of a movement trace pattern before an advertisement presentation part in the present invention is installed.

FIG. 14B is an example of a movement trace pattern after the advertisement presentation part in the present invention is installed.

FIG. 15A is an example in this case that the unmanned aerial vehicle in the present invention delivers baggage.

FIG. 15B is an example in this case that the unmanned aerial vehicle in the present invention delivers was proximate to a user terminal of a sufferer.

FIG. 16A is an example of a flight of three unmanned aerial vehicles and a calculation of the presence position of the user terminal by triangulation in the present invention.

FIG. 16B is an example of an information table by the flight of three unmanned aerial vehicles in the present invention.

FIG. 17A is an example of a flight path of three unmanned aerial vehicles in the present invention.

FIG. 17B is an example of a display of a group area and a movement trace pattern of the group.

DESCRIPTION OF EMBODIMENTS

The preferred embodiments of the present invention will be explained below according to the attached drawings; thereby the present invention will be clearly understood. The embodiments below are examples materializing the present invention, and do not limit the technical scope of the present invention.

As shown in FIG. 1, an analytic system 1 according to the present invention comprises one or more unmanned aerial vehicles 12 equipped with a radio unit 11 capable of performing short-distance radio communication to a user terminal 10, and a server 14 (analytic server) capable of performing radio communication to the unmanned aerial vehicle 12 through a network 13.

The user terminal 10 includes a handheld terminal (smartphone) with a touch panel, a wearable terminal, a tablet type terminal, or the like. The user terminal 10 includes a terminal display part (output part) displaying a screen, a terminal reception part (input part) receiving an input of predetermined instructions by the operation of a user, and a communication unit for radio communication including short-distance radio communication.

The radio unit 11 includes a communication unit for short-distance radio communication to the user terminal 10. Here, the short-distance radio communication means that the user terminal 10 exists in a range of decades cm—one hundred several decades m of the radio unit 11 and the radio unit 11 and the user terminal 10 transmit or receive data, and the short-distance radio communication includes unidirectional and interactive. The radio unit 11 receives a short-distance radio wave from the user terminal 10 entered in a radio wave reception zone (reception range) of the radio unit 11, transmits a short-distance radio wave including predetermined information, and sends to the user terminal 10. The radio unit 11 receives a short-distance radio wave from a Beacon terminal transmitting a short-distance radio wave only.

The unmanned aerial vehicle 12 includes a unmanned multi-copter (drone), unmanned helicopter, unmanned airship, unmanned robot airplane, or the like. The unmanned aerial vehicle 12 comprises the radio unit 11, a fly part for making a main body of the unmanned aerial vehicle 12 fly in the sky, a communication part for a radio communication, and a GPS unit for acquiring GPS position information of the main body. The unmanned aerial vehicle 12 comprises an obstacle detection sensor, when detecting an obstacle appeared during a flight, flies avoiding the obstacle. When plural unmanned aerial vehicles 12 fly, each of the unmanned aerial vehicles 12 may fly freely of form a specific formation and fly.

The network 13 includes a LAN (Local Area Network) via a relay device 15b (access point), a WAN (Wide Area Network) via a radio base station 15c, a satellite communication network via a satellite 15d and a satellite earth station 15e, or the like. The satellite 15d includes an iridium satellite, or an INMARSAT satellite. When connecting to the network 13, the unmanned aerial vehicle 12 can radio-communicate with the server 14.

The analytic server 14 is a computer used generally, comprises a memory part storing date, and a process part performing various processes. The analytic server 14 distributes information to the user terminal 10 through the network 13.

The user terminal 10, the radio unit 11, the unmanned aerial vehicle 12, and the analytic server 14 include CPU, ROM, RAM, and the like (not shown), and for example, CPU uses RAM as a working area and executes program stored in ROM, etc. About the undermentioned parts, CPU executes the program for materializing the undermentioned parts.

As referring to FIG. 2, FIG. 3, the structure and execution steps in the embodiment of the present invention are explained. Here, for ease of understanding, the case of one unmanned aerial vehicle 12 will be described as an example.

First an analyst designates a predetermined area where users come and go, and sets a flight path of one unmanned aerial vehicle 12 (e.g., drone) in the area.

The area includes a shopping district, a shopping mall, a residential area, an apartment area, an industrial area, a sightseeing spot, a park, a mountain, a river, or the like. The flight path is a sky where the drone can fly, and is arbitrarily set by the analyst. For example, as shown in FIG. 4A, when the area 40 is a shopping district the flight path 41 is set to a sky of a road between buildings of the shopping district.

A flight form of the drone 12 on the flight path is not particularly limited. For example, the flight form includes a consecutive flight form to go around plural spots P constituting the flight path in turn. The consecutive flight form is a form to repeat at the plural spots P numbered in order that, when flying towards the first spot P1 at a predetermined flight speed and arriving at the first spot P1, the drone 12 flies towards the next second spot P2. When flying towards a specific spot P, the drone 12 compares GPS position information acquired by the GPS unit during a flight with position information of the spot P of flight path, and determines the main body of the drone 12 have arrived at the spot P when the GPS position information coincides with the position information of the spot P.

For example, as shown in FIG. 4A, the flight path 41 is set to the sky of the road between plural buildings B existing in the area 40, and the turn that the drone 12 flies form a flight start spot P0 to plural spots P1, P2, P3 (here three points) in a rectangular form. The drone 12 flies in a rectangular form by flying to plural spots P1, P2, P3 of the flight path 41 with the consecutive flight form in turn, and comes back to the flight start spot P0 again.

As shown in FIG. 4B, a flight altitude of the drone 12 is set from the ground within the maximum reception distance H1 (e.g., 180 m) where a short-distance radio wave of the user terminal 10 existing on the ground reaches to the drone 12. When a search target by the flight of the drone 12 includes a Beacon terminal 15a in the area in addition to the user terminal 10, so the maximum reception distance H2 of the Beacon terminal 15a is shorter than the maximum reception distance H1 of the user terminal 10, the flight altitude of the drone 12 is set from the ground within the maximum reception distance H2 (e.g., 80 m) of the Beacon terminal 15a.

When a flight condition including the flight path 41 of the drone 12 is set, the analyst makes the drone 12 fly (FIG. 3, S101). Here, the method for making the drone 12 fly is not particularly limited. For example, as shown in FIG. 4B, when the analyst inputs the flight condition into the server 14, the server 14 makes the drone 12 fly by remote control through the network 13. As other methods, when the analyst inputs the flight condition into the drone 12 by using an exclusive terminal 42, the drone 12 makes the main body fly according to the input flying condition. When the analyst carries an exclusive operation device 43 of the drone 12 in an on-site area and inputs the flight condition into the exclusive operation device 43, the analyst makes the drone 12 fly. A flight control part 201 for controlling the flight of the drone 12 may be equipped in a place being different from the drone 12 such as the server 14, or may be equipped with the main body of the drone 12. In addition, it is the same even when if drone 12 is a plural number.

When the light control part 201 starts a flight of the drone 12, a radio wave acquisition part 202 of the server 14 makes the radio unit 11 start a detection of a short-distance radio wave of the user terminal 10 through the network 13 (FIG. 3, S102).

Here, the method that the radio wave acquisition part 202 makes the radio unit 11 detect the short-distance radio wave is not particularly limited. For example, when the flight control part 201 makes the drone 12 fly with the consecutive flight form, the radio wave acquisition part 202 always activates the radio unit 11, and makes the radio unit 11 receive a short-distance radio wave always.

As shown in FIG. 5A, during the flight control part 201 makes the drone 12 fly from the flight start spot P0 to the first spot P1, for example, A user with a user terminal 10 appears from a gap of the buildings in the area 40. Then the radio unit 11 detects a short-distance radio wave sent from the user terminal 10 (FIG. 3, S102 YES).

Here, the user terminal 10 usually sends a short-distance radio wave (Beacon, no directionality radio wave) to search a relay device 15*b* of a radio LAN communication regularly. The short-distance radio wave includes a terminal ID (e.g., "aaa") for identifying the user terminal 10. The terminal ID is information to identify the user terminal 10 such as MAC addresses, is not information to identify the user individual.

For example, as shown in FIG. 5B, when the user terminal 10 enters in a radio wave reception zone of the radio unit 11 of the drone 12 in the sky, the radio unit 11 detects a radio wave from the user terminal 10, the radio wave acquisition part 202 acquires a terminal ID ("aaa") included in the radio wave, an intensity (e.g., "Far") of the radio wave, and a detection time (e.g., "2016/4/5/9:00") when the radio wave is detected, as radio wave information from the radio unit 11 through the network 13 (FIG. 3, S103).

A Beacon terminal 15*a* installed in a specific location for advertising and marketing transmits a short-distance radio wave including a BeaconID (e.g., "zzz") such as a MAC address to identify the Beacon terminal 15*a* regularly. Then when the radio unit 11 of the drone 12 is proximate to a Beacon terminal 15*a* existing under the flight path 41, the radio unit 11 detects a radio wave from the Beacon terminal 15*a*, and the radio wave acquisition part 202 acquires a BeaconID of the radio wave, n intensity of the radio wave, and a detection time as radio wave information through the network 13. Here, the BeaconID is distinguished from the terminal ID, although the radio wave information including the BeaconID is not information used for an analysis of user attribute information directly, the radio wave information is acquired according to need. In addition, the radio wave acquisition part 202 may be equipped with not only the server 14 but also the drone 12.

When the radio wave acquisition part 202 acquires the radio wave information, a flight position acquisition part 203 of the server 14 acquires GPS position information of the drone 12 when the radio unit 11 detected the short-distance radio wave, as a flight position of the drone 12 based on a GPS unit of the drone 12 (FIG. 3, S104).

Here, the method that the flight position acquisition part 203 acquires the flight position is not particularly limited. For example, as shown in FIG. 5B, the GPS unit 50 of the drone 12 calculates GPS position information by receiving a GPS satellite signal from the GPS satellite 51. When the radio unit 11 detects a short-distance radio wave, the flight position acquisition part 203 acquires GPS position information as a flight position from the GPS unit 50 of the drone 12. In addition, the flight position acquisition part 203 may be equipped with not only the server 14 but also the drone 12.

Now, when the flight position acquisition part 203 acquires the flight position, a terminal position calculation part 204 of the server 14 calculates a presence position of the user terminal 10 in the area based on a radio wave intensity of the acquired radio wave information, and the acquired flight position of the drone 12 (FIG. 3, S105).

Here, the method that the terminal position calculation part 204 calculates a presence position is not particularly limited. First as shown in FIG. 6A, the terminal position calculation part 204 memorizes in an information table 600 by associating the unit ID 601 (e.g., "111") to identify the radio unit 11 of the drone 12, the radio wave information 602, and the flight position 603 ("X1, Y1"). When plural drones 12 fly, the unit ID of the radio unit 11 is information to identify the drone 12. The radio wave information 602 includes the terminal ID 602*a*, the radio wave intensity 602*b*, and the detection time 602*c*. In this way, it is possible to compile information for calculating a presence position of the user terminal 10 into a database.

The radio wave intensity 602*b* of the radio wave information 602 means a reception distance (relative distance) between the user terminal 10 and the radio unit 11. The radio wave intensity 602*b* becomes stronger, the reception distance becomes shorter. Here, the radio wave intensity 602*b* means a proximity sorted for plural (e.g., four) stages according to the reception distance in the short-distance radio wave. For example, the radio wave intensity 602*b* shows "Immediate", "Near", "Far", or "Unknown" in the order that the radio wave intensity is strong, and it is possible to correspond a predetermined reception distance depending on kinds of the radio wave intensities 602*b*.

As shown in FIG. 6B, the reception distance r1 of the radio wave intensity "Immediate", "Near", "Far" is "decades cm", "decades m", "several decades m" in turn. Meanwhile, the reception distance r1 of the radio wave intensity "Unknown" is more than "several decades m", and it is not possible to detect a radio wave. Then, the maximum reception distance of the short-distance radio wave in this case is "several decades m" in the radio wave intensity "Far". In addition, a relationship between a kind of the radio wave intensity and a reception distance is appropriately set depending on a frequency of the radio wave, and the like.

So the radio unit 11 exists at the drone 12 of a flight altitude H from the ground, as shown in FIG. 6B, the flight altitude H of the drone 12 becomes a sky height H of the radio unit 11, and the radio unit 11 forms a spherical radio wave reception zone of which a radius is a reception distance r1 corresponding to the radio wave intensity on the center of the radio unit 11. Then, when the radio unit 11 receives a radio wave of the user terminal 10 existing the ground, a cone-shaped radio wave reception zone 61 forming on a bottom plane of the lower surface S being close to the ground among the spherical radio wave reception zone 60 becomes a range capable of receiving the radio wave of the user terminal 10 substantially.

Then, for example, as shown in FIG. 7A, in an intensity distance table 700, a radio wave intensity 701 (e.g., "Far") and a lower reception distance 702 (e.g., "r2") to mean a radius of a bottom plane in a cone-shaped radio wave reception zone 61 are memorized by associating with each other beforehand. And, the terminal position calculation part 204 acquires a lower reception distance 702 corresponding to the radio wave intensity 701 of the acquired radio wave information from the intensity distance table 700, and calculates a circle region 70 which of a radius is the acquired lower reception distance ("r2") on the center of the flight position ("X1, Y1") as a presence position of the user terminal 10 of the terminal ID ("aaa"). It means that the user terminal 10 (that is, the user) is present in the circle region 70. In addition, the lower reception distance r2 depends on the reception distance r1 of the radio wave intensity and the sky height H of the radio unit 11, and is appropriately set depending on the flight condition of the drone 12. Since the reception distance r1 of the radio wave intensity "Immediate" is less than decades cm, it is impossible to receive radio wave of the user terminal 10 at the radio wave intensity "Immediate", and may be deleted. Instead of the intensity distance table 700, a predetermined calculation formula may be prepared beforehand, and the reception distance outputted by substituting the radio wave intensity into the calculation formula may be used. In addition, for example, the terminal position calculation part 204 uses a reception distance r1 corresponding to the radio wave intensity 701 as it is, and calculates a circle region 70 which of a radius is a reception distance r1 corresponding to the acquired radio wave intensity on the center of the flight position ("X1, Y1") as a presence position of the user terminal 10.

In this way, by concretely limiting the presence position of the user terminal 10 by using the radio wave intensity in the short-distance radio communication, it is possible to improve the accuracy of the presence position of the user terminal 10. For example, when a presence position of the user is calculated by using the user terminal equipped with GPS only, the user terminal needs to communicate directly with GPS satellite, the error of GPS position information may be 100 m or more at areas where it is difficult to receive a radio wave such as a GPS satellite signal (e.g., shadow areas, inter-building areas). Meanwhile, in the present invention, since the drone 12 in the sky receives a GPS satellite signal, the error of GPS position information can be suppressed to decades m. For example, the error of the GPS position information is decades m or less at areas commanding a fine view. Further, the user terminal 10 performs a short-distance radio wave communication with the drone 12 in the sky, the drone 12 being closer to the user terminal 10 than a GSP satellite, even in the area where it is conventionally difficult to receive a radio wave, it is possible to receive a short-distance radio wave from the user terminal 10 surely. As a result, it is possible to suppress the error of a presence position of the user terminal 10 to decades m, and to calculate user action information concretely.

Then, when the terminal position calculation part 204 calculates the presence position of the user terminal 10, a user attribute analysis part 205 of the server 14 arranges the calculated presence position of the user terminal 10 in map information corresponding to the area 40, and analyzes user attribute information of the user terminal 10 based on place attribute information indicating a characteristic of the place where the presence position is arranged (FIG. 3, S106).

Here, the method that the user attribute analysis part 205 analyzes the user attribute information is not particularly limited. For example, the user attribute analysis part 205 acquires map information of the area 40 previously stored in a database of the server 14. The map information registers basic information of a map such as the name of a building, the name of a mountain, the name of a river, etc.

For example, as shown in FIG. 7B, map information 71 in which the area 40 is a shopping district registers the name 72 (e.g., "Department Store A") of a building installed for each place in the area 40.

Here, depending on the basic information in the map information 71, the place attribute information (category) indicating the characteristic of the place is set with a specific place in the area 40 beforehand. As shown in FIG. 7B, the place attribute information "Shopping" is set with a place of a region 73 where buildings "Department Store A", "Shop" gather together, and the like gather, the place attribute information "Food and Drink" is set with a place of a region 74 where buildings "Cafe", "Restaurant" and the like gather, and the place attribute information "Job" is set with a place of a region 75 where buildings "Office", "Book" and the like gather. The region defining the place and the place attribute information are appropriately set by the analyst.

And, the user attribute analysis part 205 arranges the calculated presence position 70 of the user terminal 10 to the map information 71 where the place attribute information was already set, and analyzes place attribute information of the place being close to the presence position 70 of the user terminal 10 as user attribute information.

In the case of the map information 71 shown in FIG. 7B, since the place where the place attribute information is set is a wide region, it is analyzed that the place attribute information "Shopping" of the place of the region 73 including the presence position 70 of the user terminal 10 is related to the user attribute information, and it is presumed that the user of the user terminal 10 is interested in "Shopping".

In the above description, although the place attribute information is set with the region defining the place of a range, the place attribute information may be set for each basic information of the map information 71. For example, the basic information (e.g., the name of a building) capable of setting the place attribute information is extracted from the map information 71, and as shown in FIG. 8A, in a place attribute information table 800, the name 801 (e.g., "Department Store A", etc.) of the building of the extracted basic information and place attribute information 802 (e.g., "Ladies' fashion", etc.) indicating a characteristic of the place are memorized by associating with each other. In this way, it is possible to assign place attribute information specifically for each place.

Then, as shown in FIG. 8B, the user attribute analysis part 205 arranges the presence position 70 of the user terminal 10 in the map information 71. Since the presence position 70 of the user terminal 10 is indicated by a circle region, the user attribute analysis part 205 selects a building overlapping with the circle region 70. Here, when there are plural buildings overlapping, for example, the user attribute analysis part 205 calculates an overlapping area of a building (e.g., "Department Store A", "Department Store B") overlapping with the circle region 70, and selects a building having the largest overlapping area ("Department Store A") as the building closest to the user of the user terminal 10. And, the user attribute analysis part 205 refers to the place attribute information table 800, and analyzes place attribute information corresponding to the selected building as user attribute information.

In this way, by using the presence position 70 of the user terminal 10 with high accuracy, it is easy to specifically identify a place of the map information 71 related to the presence position 70, and it is possible to analyze user attribute information with the place attribute information classified each place of the map information 71 concretely.

And, when the user attribute analysis part 205 analyzes the user attribute information, unless the flight path 41 of the drone 14 is finished (FIG. 3, S107N0), the flight control part 201 continues the flight of the drone 12 sequentially (FIG. 3, S101), and the radio wave acquisition part 202 restarts a detection of a short-distance radio wave (FIG. 3, S102). In this way, it is possible to monitor the user terminal 10 by moving the radio unit 11 by the flight of the drone 12, and collect user action information in a wide range without requiring plural radio units 11.

By the way, when the user attribute analysis part 205 analyzed the user attribute information, distribution information corresponding to the user attribute information may be distributed to the user terminal 10 of this user. For example, an information distribution part 206 of the server 14 refers to a distribution information table. As shown in FIG. 9A, in a distribution information table 900, user attribute information 901 and distribution information 902 (e.g., "abc") thought to be preferable to a user having the user attribute information 901 (e.g., "Ladies' fashion") are memorized by associating with each other. The distribution information 902 includes advertisement information or tourist information related to a place including a presence position of the user terminal 10, advertisement information related to a building of a place, emergency information of a place, or the like. The information distribution part 206 acquires distribution information 902 corresponding to the analyzed user attribute information 901. Since the user attribute information is different depending on a presence position 70 of the user terminal 10, it is possible to distribute distribution information 902 suitable for a user possessing a user terminal 10.

Here, since it is possible to associate plural distribution information 902 with one user attribute information 901, for example, one distribution information 902 is memorized by associating a presence region 903 defining a specific region in the area 40. And, when plural distribution information 902 exist to one user attribute information 901, the information distribution part 206 may designate a presence region 903 being overlapping or close to the presence position 70 of the user terminal 10, and acquire distribution information 902 corresponding to the designating presence region 903. If first point in time when the user attribute information 901 was analyzed is different from second point in time when the distribution information 902 is distributed, it is particularly effective from a viewpoint of a distribution of most suitable distribution information 902 to distribute different distribution information 902 according to the presence region 903. Further, the priority 904 may be memorized by associating with each of plural distribution information 902, and the information distribution part 206 may acquire the distribution information 902 with the highest priority 904. The priority 904 is appropriately changed according to the timing or the like. In this way, by switching distribution information 902 in consideration of the presence region 903 and the priority 904, it is possible to distribute distribution information 902 suitable for the user with good timing. In addition, the information distribution part 206 may limit the optimum distribution information 902 among plural distribution information 902 for to a specific user terminal 10 based on a combination of the presence region 903 and the priority 904.

And, as shown in FIG. 9B, the information distribution part 206 distributes the acquired distribution information 902 to a user terminal 10 of a user having the user attribute information 901 with using the terminal ID ("aaa") of the user terminal 10 through the radio unit 11 of the drone 12 of the network 13 (FIG. 3, S108). The distribution form is not particular limited, for example, the distribution form is a push type distribution.

Here, the user terminal 10 receiving the distribution information 902 displays a distribution screen. As shown in FIG. 9B, the distribution screen 905 displays a symbol "!" 906 indicating that information has been received, contents (e.g., "Fashion Sale") 907 of the distribution information, an "OPEN" key 908, and a "CLOSE" key 909. The display form includes a dialog display, a banner display, and a badge display.

When the user touches the "OPEN" key 908, the user terminal 10 refers to a link destination of a provider of the distribution information 902, and displays detailed information (e.g., coupon information) of the link destination. In this way, it is possible to provide information being a possibility of interest of the user to the user immediately. The link destination includes store information, regional information, renewal information, recommended information, and the like. When the user touches the "CLOSE" key 909, the user terminal 10 closes the distribution screen 905. When the distribution information 902 is a push notification, since opening of the push notification is notified to the server 14 via the network 13, by studying the opening ratio of the push notification of the distribution information 902, it is possible to review and reconsider the distribution information 902.

In the above description, the information distribution part 206 distributes distribution information 902 suitable for each user terminal 10 to all of the user terminals 10 analyzed user attribute information, further, the information distribution part 206 may distribute distribution information 902 to a specific user terminal 10 downloaded an exclusive application limitedly. By incorporating the SDK (software development kit) of the radio unit 11 into an arbitrary application among application downloaded to the user terminal 10, the information distribution part 206 may distribute distribution information 902 to a user terminal 10 having the application.

By the way, when calculating plural presence positions having different detection times with respect to a specific (same) user terminal 10, the terminal position calculation part 204 may calculate a movement trace of the specific user terminal 10 by associating the plural presence positions in a time series with using each of the detection time, and the user attribute analysis part 205 may analyze user attribute information including a user life pattern or a hobby preference by arranging the calculated movement trace of the user terminal 10 in the map information.

For example, as shown in FIG. 10A, when the flight control part 201 makes the drone 12 pass the second spot P2 from the first spot P1 and makes the drone 12 fly towards the third spot P3, the user of the user terminal 10 which of the presence position was calculated some time ago is proximate to the radio unit 11 of the drone 12. Then as described above, the radio unit 11 detects a radio wave from the user terminal 10, the radio wave acquisition part 202 acquires a terminal ID ("aaa") of the radio wave, a radio wave intensity ("Far"), and a detection time (e.g., "2016/4/5/9:30") as radio wave information (FIG. 3, S103). Further, the flight position acquisition part 203 acquires GPS position information of the drone 12 when the radio unit 11 detected the radio wave, as a flight position of the drone 12 based on a GPS unit 50 of the drone 12 (FIG. 3, S104).

And, as shown in FIG. 10B, the terminal position calculation part 204 associates the newly acquired radio wave information 602 and the flight position 603 ("X2, Y2") with the unit ID ("111") 601 of the drone 12 in the information table 600, and memorizes.

As shown in FIG. 11A, for example, the terminal position calculation part 204 calculates a circle region 110 which of a radius is a reception distance ("r2") corresponding to the radio wave intensity 603b of the new radio wave information 602 on the center of the new flight position 603 ("X2, Y2") as a presence position of the user terminal 10 of the terminal ID ("aaa").

Next, as shown in FIG. 11A, the terminal position calculation part 204 can calculate a movement trace 111 of the user terminal 10 by associating plural presence positions 70, 110 of the same terminal ID in time series. And, the user attribute analysis part 205 arranges the movement trace 111 of the user terminal 10 in the map information 71, and acquires place attribute information of places close to the presence positions 70, 110 of the movement trace 111 for each of the presence positions 70, 110 in order of chronological order. Here, for example, "Shopping" and "Job" are acquired in order as place attribute information.

For example, as shown in FIG. 11B, in a user attribute information table 1100, plural place attribute information 1101 and user attribute information 1102 estimated by the plural place attribute information 1101 (combination) are associated with each other and are memorized. The place attribute information 1101 here includes the order in addition to the kinds. The user attribute information 1102 includes gender, age group, hobby preference, and life pattern. And, the user attribute analysis part 205 sequentially compares plural place attribute information ("Shopping", "Job") with place attribute information 1101 of the user attribute information table 1100, and acquires the user attribute information 1102 ("Office Lady") corresponding to matched plural place attribute information 1101 ("Shopping", "Job") as a user attribute information of the user terminal 10. In this way, by considering the kinds and the order of plural place attribute information, it is possible to analyze user attribute information concretely.

In the above description, although two presence positions with different detection times are calculated from two different flight positions and one movement trace is calculated, even if the same flight position, a radio wave intensity is different so that two presence positions with different detection times can be calculated from two different radio wave intensities. Then, in this case, the terminal position calculation part 204 calculates one movement trace from two presence positions with different detection times every time the radio wave intensity changes (e.g., "Far"->"Near"), and it may be used for analysis of the user attribute information. Furthermore, even when two or more presence positions with different detection times are calculated in the same user terminal 10, the same applies.

When the terminal position calculation part 204 associates two or more presence positions with different detection times in time series, if the interval between two detection times of two presence positions adjacent in a time series is within a predetermined time (e.g., one hour, etc.), the terminal position calculation part 204 associates the two presence positions in time series. If the interval between two detection times exceeds the predetermined time, the terminal position calculation part 204 does not associate the two presence positions in time series, and determines to be a part of another movement trace. In his way, it is possible to calculate the movement trace at two presence positions temporally close to each other and to be closer to the movement trace of the real user.

When the user of the specific user terminal 10 repeatedly appears at the different time in the area 40 and the radio unit 11 of the drone 12 repeatedly detects a radio waves of a specific user terminal 10, plural user attribute information are generated for the specific user terminal 10 as an analysis result. In this case, the user attribute analysis part 205 selects user attribute information having a high appearance frequency or user attribute information analyzed up to a predetermined period (e.g., several days) before the current time among plural user attribute information preferentially, it is possible to be closer to real user attribute information.

By the way, in the area 40 where a large number of user terminals 10 exist, such as the main street, the terminal position calculation part 204 can calculate presence positions of a large number of user terminals 10. Then, the user attribute analysis part 205 may analyze user attribute information of a group (crowd, comprising of users) in the area 40 based on place attribute information of a place of the map information 71, the place where the presence positions of a large number of user terminals 10 are concentrated.

For example, as shown in FIG. 12A, the analyst sets the flight path 41 that the drone 12 flies from the flight start spot P0 through plural spots P1, P2, P3 and arrives at the flight start spot P0 in the going direction, and flies from the flight start spot P0 through plural spots P3, P2, P1 and arrives at the flight start spot P0 in the returning direction. Next the flight control part 201 makes the drone 12 fly towards each spot P1, . . . , P3. Here, for ease of understanding, the radio wave acquisition part 202 detects a short-distance radio wave from each of plural user terminals 10 by the radio unit 11 for each spot P1, P2, P3, and acquires radio wave information for each of the user terminals 10. And, the flight position acquisition part 203 acquires GPS position information of the spot P of the drone 12 as a flight position of the drone 12.

Here, since the number of the user terminals 10 is enormous, the terminal position calculation part 204 acquires radio wave intensities of the radio wave information of each of the user terminals 10 uniformly, calculates right under the acquired flight position P as a presence position P of the user terminal 10, and associates plural user terminals 10 (terminal IDs of the radio wave information) with the calculated presence position P. And, the user attribute analysis part 205 arranges the presence positions P0, P1, . . . P3 in the map information 71, counts the number of the user terminals 10 (unique (the only) terminal IDs) and displays a circle of the size corresponding to the counted number for each of the presence positions P.

Here, since the flight path 41 has an opportunity to collect radio wave information of the user terminal 10 in a going direction and a returning direction at one spot P, the terminal position calculation part 204 may sum all of the terminal IDs associated with a specific presence position P in the going direction and the returning direction, and count the number of the summed terminal IDs. Or the terminal position calculation part 204 may distinguish between the terminal IDs in the going direction and the terminal IDs in the returning direction, and count the number of the distinguished terminal IDs.

As shown in FIG. 12B, when the user attribute analysis part 205 displays a circle 120 indicating the number of the terminal IDs for each of presence positions P in the map information 71, since the size of the circle 120 is corresponding to the number of the user, it is possible to understand at a glance where users are concentrated. And, the user attribute analysis part 205 analyzes it as user attribute information of a group in the area 40 by using place attribute information (e.g., "Food and Drink") of the place close to the circle 120 having the largest size. In this way, it is possible to monitor the degree of concentration of the users in a wide area 40 by the flight of the drone 12, and analyze user attribute information (hobby preferences, etc.) of the group in this area concretely. In the above description, although the size of the circle 120 is corresponded to the number of terminal IDs, for example, the density of the color of a circle having a predetermined size may be corresponded to the number of terminal IDs.

By including not only the going direction but also the returning direction of the flight path 41, it is easy to calculate a point-to-point link strength of two presence positions among plural presence positions. Namely, when the drone 12 completes the flight on the flight route 41, as shown in FIG. 13A, in a terminal information table 1300, a presence position (e.g., "P0" etc.) 1301 and a flight direction (e.g., "going direction", "returning direction") 1302 when the radio wave information (terminal ID) are collected, a terminal ID (e.g., "aaa" etc.) 1303 of the radio wave information, and a detection time 1304 of the radio wave information are associated with each other, and are memorized.

Meanwhile, combinations of two presence positions (e.g., "P0->P1", "P0->P1", etc.) are defined as movement trace patterns 1305, the user attribute analysis part 205 searches a specific terminal ID 1303 for each of presence positions 1301, if there are two or more specific terminal IDs 1303, and calculates it as a movement trace pattern of the specific terminal ID by associating two or more presence positions of the specific terminal ID 1303 in time series with using the detection times 1304 of the radio wave information of the specific terminal ID 1303. And, the user attribute analysis part 205 compares the movement trace pattern of the specific terminal ID with the defined movement trace pattern 1305 for each of the terminal IDs, and counts the number of the movement trace pattern which both are matched. And, the user attribute analysis part 205 may analyze a movement trace pattern having the largest number as a movement trace pattern (e.g., life pattern) of the group.

As shown in FIG. 13B, when the user attribute analysis part 205 displays a circle 120 corresponding to the number of terminal IDs for each of the presence positions P in the map information 71 and displays an arrow 130 indicating from the presence position of the start spot of the movement trace pattern to the presence position of the end spot the arrow 130 having a width corresponding to the number of movement trace patterns, it is possible to understand the size of the group and the movement direction of the group at first glance. FIG. 13B shows arrows 130 from the most numerous movement trace pattern ("P1->P2") to the third numerous movement trace pattern ("P3->P1"). And, the user attribute analysis part 205 acquires place attribute information (e.g., "Food and Drink" and "Job") of the place being close to each of the presence position P1 of the start spot and the presence position P2 of the end spot of the most numerous movement trace pattern ("P1->P2") in order. As described above, by using the user attribute information table 1100, the user attribute analysis part 205 can analyze user attribute information ("Worker") of the group based on plural place attribute information ("Food and Drink", "Job").

Such an analysis method is used, for example, in considering the effectiveness of advertisements. As shown in FIG. 14A, when the most numerous movement trace pattern 130a was "P1->P2" by the flight of the drone 12, in order to change the movement direction of the group, an advertisement presentation part 140 is installed, the advertisement presentation part 140 related to place attribute information (e.g., "Shopping") of the place between the presence position P1 of the start spot and the presence position P2 of the end spot of the movement trace pattern 130, the place where the group intends to concentrate. The kinds of the advertisement presentation part 140 are not particularly limited. The advertisement presentation part 140 includes poster, board, signboard, bulletin board, digital signage, hologram display device, audio broadcast speaker, leaflet distribution, etc. And, after the advertisement presentation part 140 was installed, the size of the group and the movement direction of the group in the wide area are monitored by the flight of the drone 12 again.

For example, after the advertisement presentation part 140 was installed, as shown in FIG. 14B, it is assumed that the most numerous movement trace pattern 130a changes to "P1->P0". Here, when the place attribute information of the place at the end spot of the presence position P0 is "Shopping", it is possible to determine that the advertisement presentation part 140 functions to a passenger effectively and the place attribute information has induced to the place of "Shopping". Meanwhile, when the most numerous movement trace pattern 130a is the same as "P1->P2", it is possible to determine that the advertisement presentation part 140 does not function.

As the above description, although the presence position of the user terminal 10 in a predetermined time zone when the drone 12 flew was calculated and the user attribute information of the user was analyzed, plural time zones among the time zones (morning, afternoon and evening) of one day, the season (spring/summer/autumn/winter), etc., are set beforehand, the presence position of the user terminal 10 for each of the time zones may be calculated and the user attribute information of the user may be analyzed for each of the time zones. Further, by comparing presence position of the user terminal 10 and user attribute information for each of the time zones, it is possible to analyze the change in movement direction of the user in the area 40 and the change in the user hobby preference. The same applies to the user attribute information of a group comprising of plural user terminals 10.

Since the radio unit 11 of the drone 12 can detect the radio wave of the Beacon terminal 15a, it is possible to calculate where the Beacon terminal 15a exists in the area 40. In addition to analyzing user attribute information, a presence of the Beacon terminal 15a used for advertisement and marketing may also be monitored, and may be evaluated the effectiveness of the Beacon terminal 15a.

By the way, in the above description, although the user attribute information of the user coming and going the shopping district is analyzed, it is possible to determine a specific user by setting place attribute information indicating the specific user in a place of the map information. For example, when the client of the delivery requests the delivery person to deliver baggage, the delivery person sets "delivery destination" as place attribute information in the delivery place of the map information 71 beforehand. And, the delivery person inputs the flight path 41 from the delivery source to the delivery destination to the drone 12 and makes the drone 12 deliver the baggage. The flight control part 201 makes the drone 12 fly to the delivery destination based on the flight path 41, and the radio unit 11 of the drone 12 detects short-distance radio wave from the user terminal 10 during the flight of the drone 12.

As shown in FIG. 15A, when the drone 12 is proximate to the delivery place, the radio unit 11 detects short-distance radio wave from the user terminal 10 of the client existing at the delivery place, the radio wave acquisition part 202 acquires radio wave information including the terminal ID ("bbb") of the user terminal 10 of the client, the flight position acquisition part 203 acquires a flight position of the drone 12. And, the terminal position calculation part 204 calculates a presence position of the user terminal 10 including the delivery place.

Here, the user attribute analysis part 205 arranges the presence position of the user terminal 10 including the delivery place in the map information 71, thereby analyzes user attribute information of the user terminal 10 as "client" based on the place attribute information "delivery destination" of the delivery place. For example, by receiving the analysis result, the information distribution part 206 distributes distribution information ("xyz") corresponding to the user attribute information "client" with using a terminal ID ("bbb") of the user terminal 10.

As shown in FIG. 15A, the distribution screen 1500 corresponding to the distribution information ("xyz") displays a symbol "!" 1501, contents 1502 of distribution information (e.g., "Drone will deliver products soon!", "Drone will arrive in 1 minute." etc.) and an OK key 1503. The distribution screen 1500 is appropriately designed. In this way, it is possible to guide a delivery of the baggage to the client. Such guidance type distribution information is preferable because it is possible to distribute the client only by using the exclusive application or the application incorporating the SDK as described above.

In the present invention, by realizing the monitoring of the user terminal 10 by the fight of the drone 12, for example, it is possible to search for a sufferer who has been distressed at an area where a person is difficult to go, or an area (e.g., a snowy mountain) where telephone radio waves of the mobile terminal are out of range.

For example, when a searcher searches for a sufferer, the sufferer sends short-distance radio wave from own user terminal 10, the searcher sets "distress destination" as place attribute information to a distress place (e.g., in the whole mountain area) considered to be distant in the map information 71 beforehand. The searcher inputs the flight path 41 of the area including the distress place to the drone 12, and the flight control part 201 makes the drone 12 fly based on the flight path 41. The radio unit 11 detects short-distance radio wave from the user terminal 10.

As shown in FIG. 15B, while the drone 12 is flying over the mountain, and when the radio unit 11 is proximate to the user terminal 10 of the sufferer and detects short-distance radio wave from the user terminal 10, the radio wave acquisition part 202 acquires radio wave information including the terminal ID ("ccc") of the user terminal 10, and the terminal position calculation part 204 calculates a presence position of the user terminal 10 including the distress place.

Here, the user attribute analysis part 205 arranges the presence position of the user terminal 10 including the distress place in the map information 71, thereby analyzes user attribute information of the user terminal 10 as "distress destination" based on the place attribute information "distress destination" of the distress place. For example, by receiving the analysis result, the information distribution part 206 distributes distribution information ("uvw") corresponding to the user attribute information "distress destination" with using the terminal ID ("ccc") of the user terminal 10.

As shown in FIG. 15B, the distribution screen 1504 corresponding to the distribution information ("xyz") displays a symbol "!" 1501, contents 1505 of distribution information (e.g., "Drone was discovered you. Rescue assistance!" etc.) and an OK key 1507. The distribution screen 1504 is appropriately designed. In this way, it is possible to quickly find the sufferer and distribute information such as rescue guidance, evacuation recommendation, and the like to the sufferer. Since the network 13 includes the satellite communication network, even when telephone radio waves of the mobile terminal are out of range, it is possible to distribute information from the server 14 through the network 13. In the above description, although the targeted person is the sufferer, for example, the targeted person may be a victim who was trapped in a collapsed house after a disaster (earthquake etc.).

By the way, while the radio unit 11 of the drone 12 is monitoring the user terminal 10 in the sky, it is a possibility that the drone 12 crashes due to electric power from running out or the like. In order to prevent this, the drone 12 may use an emergency battery in the flight route 41 where the user terminals 10 are concentrated. For example, when the radio wave acquisition part 202 acquires radio wave information from plural user terminals 10, a terminal number determination part 207 of the server 14 counts the number of terminal IDs (user terminals 10) of the acquired radio wave information as a count number, and determines whether or not the count number is equal to or larger than a predetermined threshold value (e.g., 10). As a result of the determination, when the count number is less than the threshold value, a battery change part 208 of the server 14 does nothing in particular. Meanwhile, when the count number is equal to or larger than the threshold value, the battery change part 208 changes from the normal battery for flying the drone 12 to the emergency battery having electric energy higher than that of the normal battery through the network 13. In this way, in a place where the user terminals 10 are concentrated, it can be reliably prevented from the crash of the drone 12 due to electric power from running out or the like. After the battery change part 208 changed to the emergency battery, while the drone 12 is flying, when the radio wave acquisition part 202 newly acquires radio wave information from plural user terminals 10, the terminal number determination part 207 counts the number of terminal IDs of the acquired radio wave information, and determines whether or not the count number is equal to or larger than the threshold value. As a result of the determination, when the count number is equal to or larger than the threshold value, the battery change part 208 does nothing in particular. Meanwhile, when the count number is less than the threshold value, the battery change part 208 changes from the emergency battery to the normal battery. In this way, in a place where the user terminals 10 are not concentrated, the normal batter is used, it is unnecessary to waste electric energy of the emergency battery. In addition, the terminal number determination part 207 and the battery change part 208 may be equipped with not only the server 14 but also the drone 12.

In the above description, the case of one drone 12 has been explained, when in the case of plural drones 12, it is possible to calculate the presence position of the user terminal 10 with high accuracy. For example, as shown in FIG. 16A, the flight control part 201 makes three drones 12 fly at the state in which three drones 12 are arranged in a triangle. In addition, the form of the arrangement need not be an exact triangle. When the three drones 12 is close to the user terminal 10 in this state, radio wave information is acquired from each of the radio units 11 of the three drones 12 at the same detection time. For example, the three drones 12 surround the user terminal 10 in the sky, so that three radio wave information can be acquired. Therefore, the terminal position calculation part 204 calculates a presence position of the user terminal 10 by triangulation with three radio field intensities (e.g., "Far") in the flight positions (e.g., "Xa, Ya", "Xb, Yb", "Xc, Yc") of the three drones 12.

Specifically, the terminal position calculation part 204 calculates three circle regions which of a radius is a reception distance corresponding to each of the radio wave intensities on the center of each of the flight positions, and calculates the centroid position of the part where three circle regions overlap as a presence position of the user terminal 10. In this way, since the centroid position by the overlapping of three circle regions is limited to one region, so that it is possible to calculate a presence position of the user terminal 10 with high accuracy. For example, in the triangulation in short-distance radio communication, the error of a presence position of the user terminal 10 may be less than or equal to 1 m depending on the radio wave reception situation. In addition, when three or more drones 12 are made to fly in a predetermined arrangement it is possible to calculate a presence position of the user terminal 10 with high accuracy.

As shown in FIG. 16B, on a database, in the information table 1600, a unit ID 1601, radio wave information 1602 (a terminal ID 1602a, a radio wave intensity 1602b, a detect on time 1602c), and a flight position 1603 are associated with each other, and are memorized. Here, when three or more unit IDs 1601 exist at the same terminal ID 1602a and at the same detection time 1602c, radio wave information from the radio unit 11 of each of the three drones 12 is acquired. The terminal position calculation part 204 determines that three radio wave information are acquired, and calculates a presence position of the user terminal 10 based on three radio wave intensities 1602b and three flight positions 1603.

Here, when three drones 12 are made to fly in a predetermined area, the presence position of a large number of user terminals 10 can be acquired with high accuracy. For example, as shown in FIG. 17A, the analysis sets the flight path 1701 that three drones 12 fly in a predetermined arrangement from the flight start spot P0 of the area 1700 through plural spots P1, P2, P3 and return to the flight start spot P0. Then, as shown in FIG. 17B, the presence positions of the plural user terminals 10 are calculated with high accuracy in the area 1700. In this case, the user attribute analysis part 205 classifies an area where the presence positions of plural user terminals 10 are gathered as a group area 1702 for each of places in the area 1700. The method for classifying the group area 1702 is not particularly limited, for example, the maximum range of the group area 1702 classified is set beforehand, the user attribute analysis part 205 encloses an area including all of the plural user terminals 10 gathered at a predetermined place, the area within the maximum range with a circle, and the user attribute analysis part 205 forms the group area 1702. And, the user attribute analysis part 205 counts the number of terminal IDs included in the classified group area 1702, and displays the group area 1702 with the color being the more darker, as the larger the number of terminal IDs. And, the user attribute analysis part 205 specifically analyzes user attribute information of the group of the area 1700 from place attribute information of the place close to the group area 1702a, the place where the number of terminal IDs is the largest.

By making three drones 12 fly with the reciprocating from the going direction to the returning direction in the above described flight path 1701, the user attribute analysis part 205 can calculate a point-to-point link strength of two group areas 1702. For example, the user attribute analysis part 205 may calculate a movement trace of a specific terminal ID by associating two or more group areas 1702 in the specific terminal ID in a time series with using the detection time at the specific terminal ID, compare the movement trace with a movement trace pattern composed of a combination of two or more group regions 1702, count the number of the movement trace pattern, and analyze the movement trace pattern having the largest number as a movement trace pattern of the group. As shown in FIG. 17B, the movement trace pattern of the group is displayed with the arrow 1703 indicating from the group area of the start spot to the group area of the end spot. The effectiveness of advertisement is also carried out in the same method as described above. The point-to-point link strength may not be a unit of the group area 1702, but also may be a unit of the movement trace of the user terminal 10, and may be obtained by averaging movement traces of plural user terminals 10.

By comprising of three drones 12 as one drone group and making plural drone groups fly in sequence on a predetermined flight path, it is possible to monitor the presence position and movement trace of the user terminal 10 in real time.

In the embodiment of the present invention, the analytic system 1 is configured to include each unit, but it may be configured that a program for materializing the units is stored in a storage medium and the storage medium is provided. In such configuration, the program is read on a system materializes the respective units. In this case, the program read from the storage medium provides the effect of the present invention. Additionally, the steps executed by the respective units may be stored in the hard disk.

INDUSTRIAL APPLICABILITY

As described above, the analytic system and the analytic method are useful for a wide area such as a building, an apartment, a store, a passage, a station, a shopping mall, a mountain, a river, and the like. It is effective as the analytic system and the analytic method that can collect user action information in a wide range including outdoors form the sky, and analyze user attribute information concretely.

REFERENCE SIGNS LIST

1 Analytic system
10 User terminal
11 Radio unit
12 Drone
13 Network
14 Server
201 Flight control part
202 Radio wave acquisition part
203 Flight position acquisition part
204 Terminal position calculation part
205 User attribute analysis part
206 Information distribution part
207 Terminal number determination part
208 Battery change part

The invention claimed is:
1. An analytic system comprising one or more unmanned aerial vehicles equipped with a radio unit capable of performing short-distance radio communication to a user terminal, and a server capable of performing radio communication to the unmanned aerial vehicle, the analytic system comprising:
a flight control process part being a program part of the server and making the unmanned aerial vehicle fly along a flight path in a predetermined area;
a radio wave acquisition process part being a program part of the server and acquiring radio wave information including a radio wave intensity when the radio unit of the unmanned aerial vehicle detects a short-distance radio wave of the user terminal during the flight of the unmanned aerial vehicle;
a flight position acquisition process part being a program part of the server and acquiring GPS position information of the unmanned aerial vehicle when the radio unit detected the short-distance radio wave, as a flight position of the unmanned aerial vehicle based on a GPS unit of the unmanned aerial vehicle;
a terminal position calculation process part being a program part of the server and calculating a presence position of the user terminal in the area based on a radio wave intensity of the acquired radio wave information, and the acquired flight position of the unmanned aerial vehicle; and a user attribute analysis process part being a program part of the server, arranging the calculated presence position of the user terminal in map information corresponding to the area, and analyzing user attribute information of the user terminal based on place attribute information indicating a characteristic of the place where the presence position is arranged, and wherein the terminal position calculation process part has an intensity distance table associating radio wave intensity, lower reception distance to mean a radius of a bottom plane in a cone-shaped radio wave reception zone among a spherical radio wave reception zone of which a radius is a reception distance corresponding to the radio wave intensity on the center of the radio unit of a sky height corresponding to a flight altitude of the unmanned aerial vehicle beforehand, acquires a lower reception distance corresponding to the radio wave intensity of the acquired radio wave information from the intensity distance table, and, calculates a circle region which of a radius is the acquired lower reception distance on the center of the flight position as a presence position of the user terminal.

2. An analytic system comprising one or more unmanned aerial vehicles equipped with a radio unit capable of performing short-distance radio communication to a user terminal, and a server capable of performing radio communication to the unmanned aerial vehicle, the analytic system comprising:

a flight control process part being a program part of the server and making the unmanned aerial vehicle fly along a flight path in a predetermined area;

a radio wave acquisition process part being a program part of the server and acquiring radio wave information including a radio wave intensity when the radio unit of the unmanned aerial vehicle detects a short-distance radio wave of the user terminal during the flight of the unmanned aerial vehicle;

a flight position acquisition process part being a program part of the server and acquiring GPS position information of the unmanned aerial vehicle when the radio unit detected the short-distance radio wave, as a flight position of the unmanned aerial vehicle based on a GPS unit of the unmanned aerial vehicle;

a terminal position calculation process part being a program part of the server and calculating a presence position of the user terminal in the area based on a radio wave intensity of the acquired radio wave information, and the acquired flight position of the unmanned aerial vehicle;

a user attribute analysis process part being a program part of the server, arranging the calculated presence position of the user terminal in map information corresponding to the area, and analyzing user attribute information of the user terminal based on place attribute information indicating a characteristic of the place where the presence position is arranged;

a terminal number determination process part being a program part of the server or the unmanned aerial vehicle, counting the number of terminal IDs of the acquired radio wave information as a count number when radio wave information from plural user terminals are acquired by the radio wave acquisition part, and determining whether or not the count number is equal to or larger than a predetermined threshold value; and a battery change process part being a program part of the server or the unmanned aerial vehicle and changing from a normal battery for flying the unmanned aerial vehicle to an emergency battery having electric energy higher than that of the normal battery, as a result of the determination, when the count number is equal to or larger than the threshold value.

3. A method of an analytic system comprising one or more unmanned aerial vehicles equipped with a radio unit capable of performing short-distance radio communication to a user terminal, and a server capable of performing radio communication to the unmanned aerial vehicle, the method comprising:

a flight control process step making the unmanned aerial vehicle fly along a flight path in a predetermined area in the server;

a radio wave acquisition process step acquiring radio wave information including a radio wave intensity when the radio unit of the unmanned aerial vehicle detects a short-distance radio wave of the user terminal during the flight of the unmanned aerial vehicle in the server;

a flight position acquisition process step acquiring GPS position information of the unmanned aerial vehicle when the radio unit detected the short-distance radio wave, as a flight position of the unmanned aerial vehicle based on a GPS unit of the unmanned aerial vehicle in the server;

a terminal position calculation process step calculating a presence position of the user terminal in the area based on a radio wave intensity of the acquired radio wave information, and the acquired flight position of the unmanned aerial vehicle in the server; and a user attribute analysis process step arranging the calculated presence position of the user terminal in map information corresponding to the area in the server, and analyzing user attribute information of the user terminal based on place attribute information indicating a characteristic of the place where the presence position is arranged in the server, and wherein the terminal position calculation process step has an intensity distance table associating radio wave intensity, lower reception distance to mean a radius of a bottom plane in a cone-shaped radio wave reception zone among a spherical radio wave reception zone of which a radius is a reception distance corresponding to the radio wave intensity on the center of the radio unit of a sky height corresponding to a flight altitude of the unmanned aerial vehicle beforehand, acquires a lower reception distance corresponding to the radio wave intensity of the acquired radio wave information from the intensity distance table, and, calculates a circle region which of a radius is the acquired lower reception distance on the center of the flight position as a presence position of the user terminal.

4. A method of an analytic system comprising one or more unmanned aerial vehicles equipped with a radio unit capable of performing short-distance radio communication to a user terminal, and a server capable of performing radio communication to the unmanned aerial vehicle, the method comprising:

a flight control process step making the unmanned aerial vehicle fly along a flight path in a predetermined area in the server;

a radio wave acquisition process step acquiring radio wave information including a radio wave intensity when the radio unit of the unmanned aerial vehicle detects a short-distance radio wave of the user terminal during the flight of the unmanned aerial vehicle in the server;

a flight position acquisition process step acquiring GPS position information of the unmanned aerial vehicle when the radio unit detected the short-distance radio wave, as a flight position of the unmanned aerial vehicle based on a GPS unit of the unmanned aerial vehicle in the server;

a terminal position calculation process step calculating a presence position of the user terminal in the area based on a radio wave intensity of the acquired radio wave information, and the acquired flight position of the unmanned aerial vehicle in the server;

a user attribute analysis process step arranging the calculated presence position of the user terminal in map information corresponding to the area in the server, and analyzing user attribute information of the user terminal based on place attribute information indicating a characteristic of the place where the presence position is arranged in the server;

a terminal number determination process step counting the number of terminal IDs of the acquired radio wave information as a count number when radio wave information from plural user terminals are acquired by the radio wave acquisition part in the server or the unmanned aerial vehicle, and determining whether or not the count number is equal to or larger than a predetermined threshold value in the server or the unmanned aerial vehicle; and a battery change process step changing from a normal battery for flying the unmanned aerial vehicle to an emergency battery having electric energy higher than that of the normal battery, as a result of the determination, when the count number is equal to or larger than the threshold value in the server or the unmanned aerial vehicle.

* * * * *